United States Patent [19]

De Couvreur et al.

[11] 3,866,147

[45] Feb. 11, 1975

[54] BALANCED CORRELATED TERNARY CODING SYSTEM

[75] Inventors: Gilbert De Couvreur; Marc Pastor, both of Sherbrooke, Canada

[73] Assignee: Universite de Sherbrooke, Sherbrooke, Canada

[22] Filed: Feb. 26, 1973

[21] Appl. No.: 336,048

[52] U.S. Cl. .............. 332/11 R, 307/209, 178/66 R, 325/38 A, 328/119, 340/347 DD

[51] Int. Cl. .............................................. H03k 13/24

[58] Field of Search ............ 332/9 R, 9 T, 10, 11 R, 332/11 D; 328/119; 307/209, 261; 325/38 R, 38 A, 38 B, 44; 178/66 R, 67, 68; 340/347 DD

[56] References Cited

UNITED STATES PATENTS

| | | | |
|---|---|---|---|
| 2,850,726 | 9/1958 | Steele | 332/9 R X |
| 3,267,459 | 8/1966 | Chomicki et al. | 307/209 X |
| 3,618,044 | 11/1971 | Cupp | 307/209 X |
| 3,654,492 | 4/1972 | Clark | 307/209 X |

*Primary Examiner*—Alfred L. Brody
*Attorney, Agent, or Firm*—Raymond A. Robic; David A. Blumethal; Arthur Schwartz

[57] ABSTRACT

A balanced correlated ternary coding system including a modulator, a demodulator and an error detector. The modulator is designed so as to code a binary signal of level 0 or 1 into a ternary signal of level +, 0, or − according to any of the following truth tables:

TABLE I

| Ternary \ Binary | 0 | 1 |
|---|---|---|
| 0 | − | + |
| + | + | 0 |
| − | 0 | − |

TABLE II

| Ternary \ Binary | 0 | 1 |
|---|---|---|
| 0 | − | + |
| + | 0 | + |
| − | − | 0 |

The demodulator is designed in such a way as to perform the inverse function of the modulator according to the following two truth tables which correspond respectively to the above truth tables of the modulator:

| TERNARY CODE | | BINARY CODE | TERNARY CODE | | BINARY CODE |
|---|---|---|---|---|---|
| n-1 | n | m | n-1 | n | m |
| + | + | 0 | + | + | 1 |
| + | 0 | 1 | + | 0 | 0 |
| − | − | 1 | − | − | 0 |
| − | 0 | 0 | − | 0 | 1 |
| 0 | + | 1 | 0 | + | 1 |
| 0 | − | 0 | 0 | − | 0 |

The error detector is designed so as to detect any one of the following code variations:

a. a ternary + followed by a ternary −;
b. a ternary − followed by a ternary +; and
c. two consecutive ternary 0.

6 Claims, 59 Drawing Figures

BALANCED CORRELATED TERNARY CODING SYSTEM

This invention relates to a ternary coding system and more particularly to a balanced correlated ternary coding system permitting to code a binary signal into a ternary signal for transmission on a transmission line and to decode the ternary signal at the receiving end of the transmission system.

Various correlated ternary coding systems are known but they generally require complicated modulators and demodulators for putting them into practice. In addition, they require expensive error detectors for detecting errors in transmission of the codes.

It is the object of the present invention to provide a correlated ternary system including a modulator, a demodulator and an error detector which are very simple in construction and thus less expensive than the known systems.

A first modulator, in accordance with the invention, comprises a logic circuit for receiving a binary code B and capable of generating at its output its complement $\overline{B}$; first and second flip flops of the JK type each having two inputs J and K and two complementary outputs Q and $\overline{Q}$ satisfying the following logic equations:

$$Q_{n+1} = \overline{Q_n} J_n + Q_n \overline{K_n} \quad (1)$$

$$\overline{Q_{n+1}} = \overline{Q_n}\,\overline{J_n} + Q_n K_n; \quad (2)$$

first and a second gates each having two inputs and one output, the output of the first and second gates being adapted for connection to one of the inputs J and K of the first and second flip flops respectively; and an arithmetic adder having first and second inputs and one output, the first and second inputs of such arithmetic adder being adapted for connection to one output of the first and second flip flops respectively and the output of the arithmetic adder providing the ternary code. Means are provided for interconnecting the output of the first and second gates to one of the inputs J and K of the first and second flip flops respectively, for interconnecting one of the outputs Q and $\overline{Q}$ of the first and second flip flops respectively to the arithmetic adder, for connecting the binary code B or its complement $\overline{B}$ to one input of the first and second flip flops and to the first input of the first and second gates, and for connecting the second input of the first and second gates to one output of the second and first flip flops respectively so that the first and second inputs of the arithmetic adder satisfy the following logic equations respectively:

$$Y_{1n+1} = \overline{Y_{1n}}\,\overline{Y_{2n}}\,\overline{B_n} + Y_{1n} B_n \quad (3)$$

$$Y_{2n+1} = \overline{Y_{1n}}\,\overline{Y_{2n}}\,B_n + Y_{2n} \overline{B_n} \quad (4)$$

wherein $B_n$ = a digit of the binary code, $Y_{1n}$, $Y_{2n}$ = the present state of the ternary code expressed in binary form, $Y_{1n+1}$, $Y_{2n+1}$ = the following state of the ternary code expressed in binary form.

A second embodiment of the modulator in accordance with the invention comprises a logic circuit for receiving a binary code B and capable of generating at its output its complement $\overline{B}$; a first and a second flip flop of the D type having one input $D$ and two complementary outputs Q and $\overline{Q}$ satisfying the following logic equations:

$$Q_{n+1} = D_n \quad (1)$$

$$\overline{Q_{n+1}} = \overline{D_n}$$

first and a second gates each having two inputs and one output, the output of the first and second gates being connected to the input of the first and second flip flops respectively and an arithmetic adder having two inputs and one output, the first and second inputs of the arithmetic adder being adapted for connection to one output of the first and second flip flops respectively, and the output of the arithmetic adder providing the ternary code. Means are provided for interconnecting one output of the first and second flip flops to the first and second inputs of the arithmetic adder respectively, for feeding the binary code B or its complement $\overline{B}$ to first input of the first and second gates, and for connecting the second input of the first and second gates to one output of the second and first flip flops respectively, so that the first and second inputs of the arithmetic adder satisfy the following logic equations respectively:

$$Y_{1n+1} = Y_{2n} \overline{B_n} \quad (3)$$

$$Y_{2n+1} = \overline{Y_{1n}} B_n \quad (4)$$

wherein $B_n$, $Y_{1n}$, $Y_{2n}$, $Y_{1n+1}$ and $Y_{2n+1}$ are as defined above.

The demodulator for converting the ternary code back into the binary code compresses a first and a second threshold detector to the input of which is fed the ternary code, the first threshold detector being adapted to generate a binary signal $B_1$ of level 1 and its complement $\overline{B_1}$ of level 0 when the ternary code fed thereto is positive and a binary signal $B_1$ of level 0 and its complement $\overline{B_1}$ of level 1 when the ternary signal fed thereto is 0 or negative, the second threshold detector being adapted to generate a binary signal $B_2$ of level 1 and its complement $\overline{B_2}$ of level 0 when the ternary code is negative and a binary signal $B_2$ of level 0 and its complement $\overline{B_2}$ of level 1 when the ternary code is 0 or positive; a first and a second flip flop of the JK type connected to the first and second threshold detectors respectively, the input J of the first and second flip flops being connected to outputs $B_1$ and $B_2$ of the threshold detectors and the input K of the first and second flip flops being connected to the outputs $\overline{B_1}$ and $\overline{B_2}$ of the threshold detectors; and gate means connected to the outputs Q and $\overline{Q}$ of the flip flops and to the inputs $B_1$, $\overline{B_1}$, $\overline{B_2}$ of the threshold detectors in such a way as to satisfy one of the following truth tables which correspond to the above modulators;

TABLE I

| Ternary Code | | Binary Code |
|---|---|---|
| n−1 | n | m |
| + | + | 0 |
| + | 0 | 1 |
| − | − | 1 |
| − | 0 | 0 |
| 0 | + | 1 |
| 0 | − | 0 |

TABLE II

| Ternary Code | | Binary Code |
|---|---|---|
| n−1 | n | m |
| + | + | 1 |
| + | 0 | 0 |
| − | − | 0 |
| − | 0 | 1 |
| 0 | + | 1 |
| 0 | − | 0 |

In the above tables, $n$ represents the present state of the ternary code and $n-1$ the preceding state whereas $m$ is the digit of the binary code corresponding to state $n$ of the ternary code.

The error detector for detecting errors in the transmission of the code includes first gate means for detecting a ternary code + immediately followed by a ternary code −, second gate means for detecting a ternary code − immediately followed by a ternary code +, and third gate means for detecting two consecutive ternary code 0.

The invention will now be disclosed in greater detail with reference to preferred embodiments thereof and to the accompanying drawings in which:

FIGS. 1*a* and 1*b* illustrate respectively two transfer diagrams permitting to translate a binary code having two levels 0 and 1 into a ternary code having three levels +, 0 and −;

FIGS. 2*a*, 2*b* and 2*c* illustrate respectively a binary signal and its translation into two different balanced correlated ternary signals;

FIGS. 3*a*, 3*b* and 3*c* illustrate three violations of the coding rules in accordance with the invention;

Figure 3B:
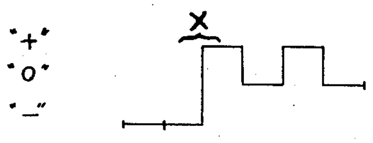
Figure 3A:
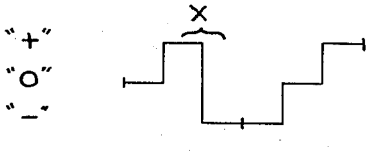
Figure 3C:
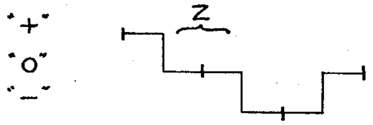
Figure 40A:
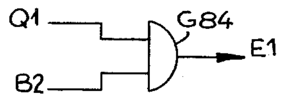
Figure 40B:
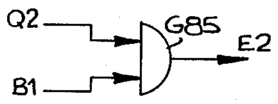
Figure 40C:
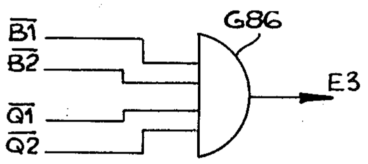
Figure 41A:
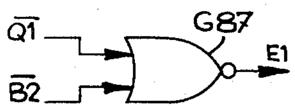
Figure 41B:
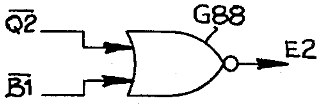
Figure 41C:
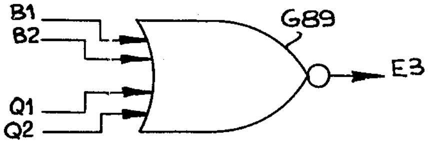

FIGS. 40*a*, 40*b* and 40*c* illustrate error detectors for detecting each of the code violations shown in FIG. 3*a*, 3*b* and 3*c* respectively;

FIGS. 41*a*, 41*b* and 41*c* illustrate alternative embodiments of the error detectors shown in FIGS. 40*a*, 40*b*, and 40*c;*

Figure 42A:
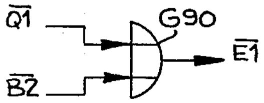
Figure 42B:
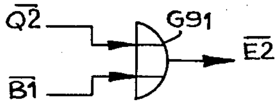
Figure 42C:
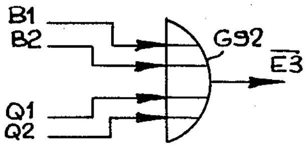
Figure 43A:
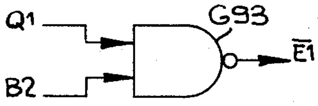
Figure 43B:
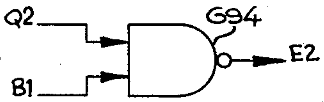
Figure 43C:
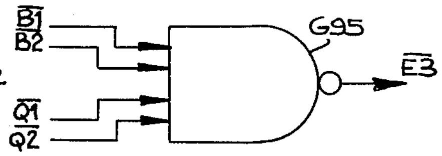

FIGS. 42*a*, 42*b* and 42*c* illustrate a second embodiment of an error detector for detecting the code violations of FIGS. 3*a*, 3*b* and 3*c* respectively;

FIGS. 43*a*, 43*b* and 43*c* illustrate alternative embodiments of FIGS. 42*a*, 42*b* and 42*c;*

Figure 44:
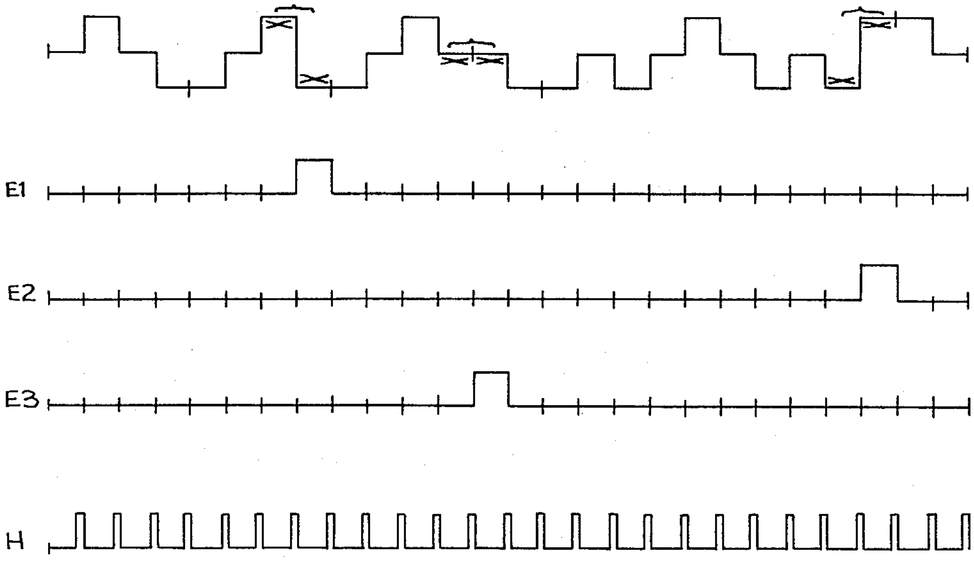
Figure 45:
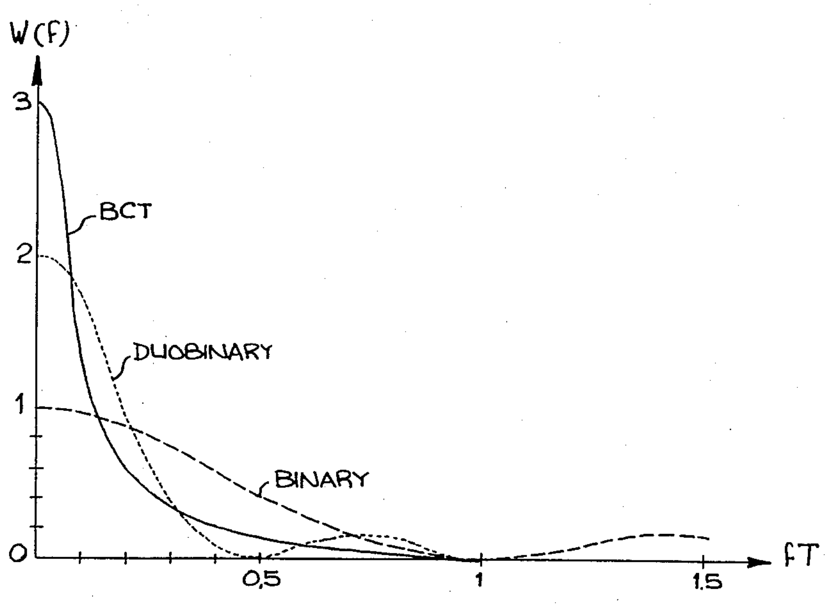
Figure 46:
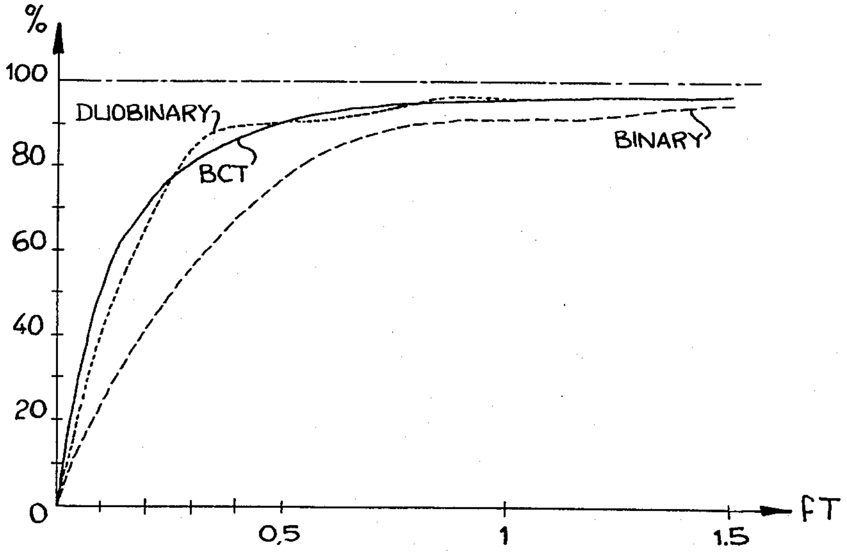

FIG. 44 illustrates the wave forms appearing at the output of the error detectors of FIGS. 40 to 43;

FIG. 45 illustrates power density spectra for the binary, duobinary and balanced correlated ternary coding systems;

FIG. 46 illustrates power ratios in the frequency band 0, fT for the binary duobinary and balanced correlated ternary coding systems.

Figure 1A:
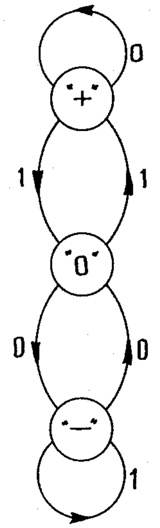
Figure 1B:
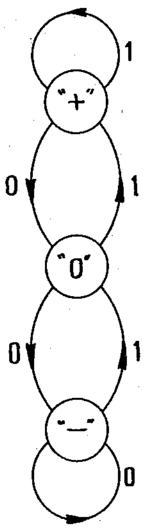

The balanced correlated ternary (BCT) coding system, in accordance with the invention, consists in transforming a binary code having only two levels (1 or 0) into a ternary code having three levels (+, 0, −) using predetermined coding rules. The new coding rules are derived from Markov chains and are based upon two main transfer diagrams which are illustrated in FIGS. 1*a* and 1*b* of the drawings and hereinafter identified as BCT 1 and BCT 2 respectively. These two diagrams are different but it will be seen that their characteristics are the same.

In examining the two transfer diagrams, it will be noted that:

a. the states are identified by circles bearing designations +, 0, − corresponding to the three logic levels of the BCT;

b. the inputs and outputs 1 or 0 of the circles are the values of the binary digits;

c. the arrows on the links interconnecting the states indicate the changes of state when the binary digits have the value indicated beside the arrows.

Figure 2A:
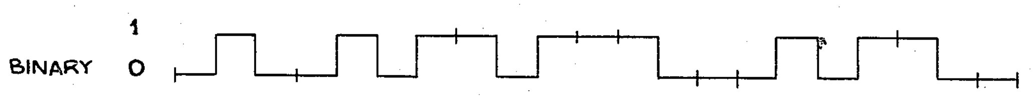
Figure 2B:
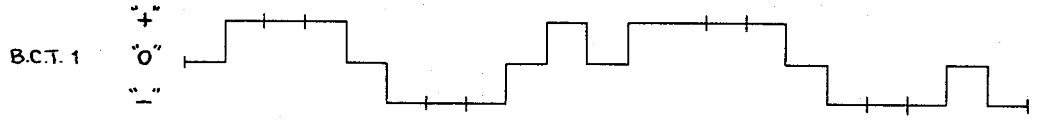
Figure 2C:
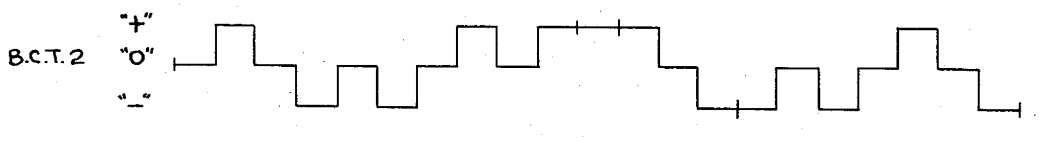

For example, let us refer to FIGS. 2*a* to 2*c* of the drawings wherein FIG. 2*a* illustrates a binary code and FIGS. 2*b* and 2*c* its conversion into a BCT1 and BCT2 code respectively. Considering first the transfer diagram of FIG. 1a and assuming that the original state of the BCT1 code is 0, it will be seen that the appearance of a binary digit 1 (second digit of FIG. 2*a*) will change tha state of the BCT1 code from 0 to +. The appearance of the third and fourth binary digits of value 0 will not change the state of the BCT1 code as evidence from the transfer diagram of FIG. 1*a*. However, the appearance of the fifth binary digit 1 will change the state of the BCT1 code from + to 0. It will be seen that the same rules apply to the conversion of the remaining digits of the binary code of FIG. 2*a*.

Considering now the transfer diagram of FIG. 1*b* and assuming again that the original state of the BCT2 code is 0, it will be seen that the appearance of the second binary digit 1 will change the state of the BCT2 code from 0 to +. However, the appearance of the third binary digit 0 will change the state of the BCT2 code back to 0. The appearance of the fourth binary digit 0 will subsequently change the state of the BCT2 code from 0 to −.

It will be observed that the possible violations of the code are the same for both the BCT1 and BCT2 codes. Indeed, such code violations are as follows:

a. a ternary code + followed by a ternary code − as illustrated by X in FIG. 3*a;* b. a ternary code − followed by a ternary code + as illustrated by Y in FIG. 3*b;* and c. two consecutive ternary codes 0 as illustrated by Z in FIG. 3*c*.

As mentioned previously, the object of the present invention is to provide a modulator for converting a binary code into a correlated ternary code, a demodulator for converting the ternary code back into a binary code, and an error detector for detecting violations of the code.

Referring to the transfer diagram of FIG. 1*a*, the changes of states may be illustrated in the following truth table:

| Ternary | Binary 0 | 1 |
|---|---|---|
| 0 | − | + |
| + | + | 0 |
| − | 0 | − |

In order to code the three ternary states +, 0 and − in binary form, it is necessary to use two binary variables which will be designated $Y_1$ and $Y_2$ in such a manner that:

| | $Y_1$ | $Y_2$ |
|---|---|---|
| 0 = | 0 | 0 |
| + = | 0 | 1 |
| − = | 1 | 0 |

The above truth table expressed in binary variables will therefore be as follows:

| | Binary | 0 | | 1 | |
|---|---|---|---|---|---|
| $Y_{1n}$ $Y_{2n}$ | $B_n$ | $Y_{1n+1}$ | $Y_{2n+1}$ | $Y_{1n+1}$ | $Y_{2n+1}$ |
| 0 | 0 | 1 | 0 | 0 | 1 |
| 1 | 0 | 0 | 1 | 0 | 0 |
| 1 | 0 | 0 | 0 | 1 | 0 |

The logic functions of the above table are as follows:

$$Y_{1n+1} = \overline{Y_{1n}}\,\overline{Y_{2n}}\,\overline{B_n} + Y_{1n}\,\overline{Y_{2n}}\,B_n$$

$$Y_{2n+1} = \overline{Y_{1n}}\,\overline{Y_{2n}}\,B_n + \overline{Y_{1n}}\,Y_{2n}\,\overline{B_n}$$

Taking into consideration the fact that the state 1, 1($Y_1$,$Y_2$) does not exist, the above logic equations may be reduced to:

$$Y_{1n+1} = \overline{Y_{1n}}\,\overline{Y_{2n}}\,\overline{B_n} + Y_{1n}\,B_n \quad (1)$$

$$Y_{2n+1} = \overline{Y_{1n}}\,\overline{Y_{2n}}\,B_n + Y_{2n}\,\overline{B_n} \quad (2)$$

On the other hand, the known transfer functions of a JK flip flop having two inputs J and K and two complementary outputs Q and $\overline{Q}$ are as follows:

$$Q_{n+1} = \overline{Q_n}\,J_n + Q_n\,\overline{K_n} \quad (3)$$

$$\overline{Q_{n+1}} = \overline{Q_n}\,\overline{J_n} + Q_n\,K_n \quad (4)$$

Figure 4:
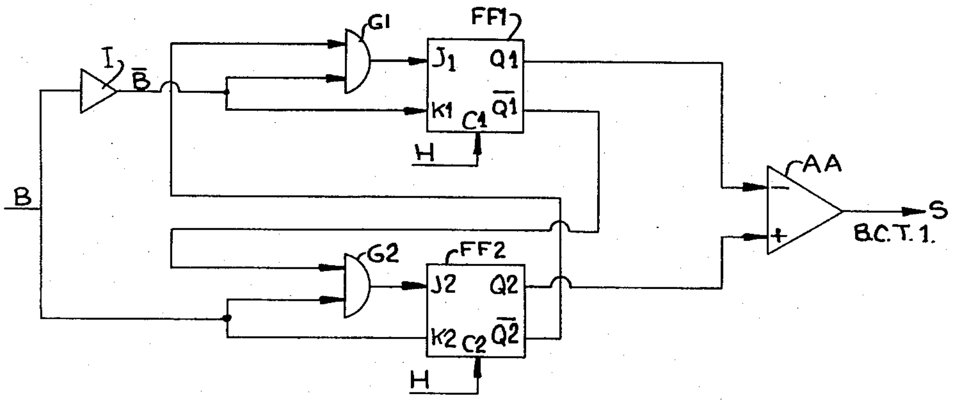
FIG. 4 illustrates a first embodiment of a modulator in accordance with the invention corresponding to the transfer diagram of FIG. 1*a;*

It will therefore be seen that a flip flop could be used for producing the outputs $Y_{1n+1}$ and $Y_{2n+1}$ by relating equations (1) and (2) with equation (3). A circuit diagram of a modulator capable of producing the above relations between equations 1 and 3 and equations 2 and 3 is illustrated in FIG. 4. Such modulator includes a logic circuit I of the type known in the art as an inverter for receiving the binary code B and capable of reproducing at its output the complement $\overline{B}$. The output $\overline{B}$ of the logic circuit I is fed to the input K1 of a first flip flop FF1 and to the first input of an AND gate G1 the output of which is connected to the second input J1 of the flip flip FF1. The binary code B is fed to the input K2 of a second flip flop FF2 and to the first input of an AND gate G2, the output of which is connected to the other input J2 of the flip flop FF2. The output Q1 of the first flip flop FF1 is connected to the input − of an arithmetic adder AA whereas the output Q2 of flip flop FF2 is connected to the input + of the arithmetic adder AA. The complementary output $\overline{Q1}$ of FF1 is connected to the second input of AND gate G2 whereas the complementary output $\overline{Q2}$ of the flip flop FF2 is connected to the second input of AND gate G1. The BCT1 code appears at the output S of the arithmetic adder AA.

In examining FIG. 4, it will be noted that the above relation between equations 1 and 3 is met by feeding to input J1 of flip flop FF1 the signal $\overline{Q2}$ $\overline{B}$ originating from the output of AND gate G1 and by feeding to the input K1 the signal $\overline{B}$. Similarly, it will be seen that the above relation between equations (2) and (3) is met by feeding to the input J2 of flip flop FF2 the signal $\overline{Q1}$ B originating from AND gate G2 and by feeding to input K2 of flip flop FF2 the signal B.

Figure 5:
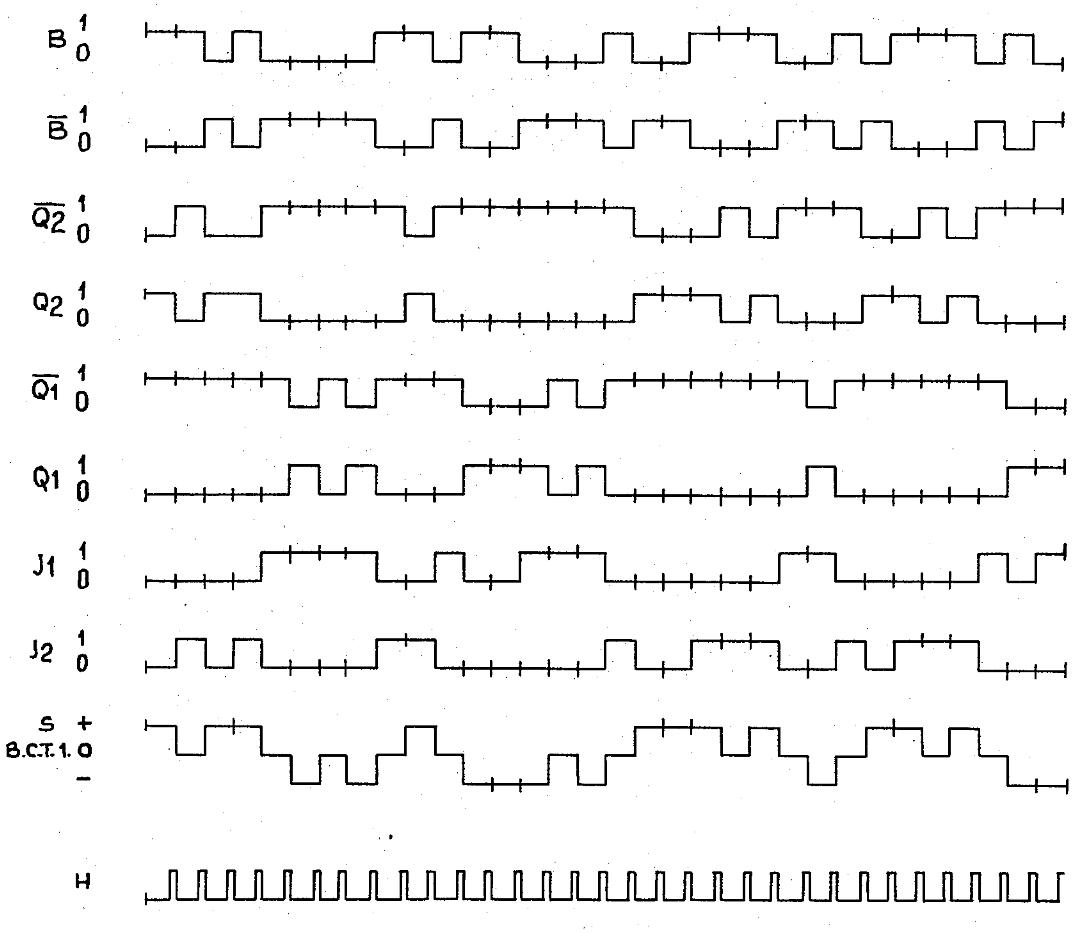
FIG. 5 illustrates the wave forms appearing at various locations in the circuit of FIG. 4.

To verify the above, let us consider the operation of the modulator of FIG. 4 when a binary signal such as illustrated at the top of FIG. 5 is fed thereto. Originally, let us assume that the state of the BCT1 code is + and that, consequently, output Q1 of flip flop FF1 is 0 and output Q2 of flip flop FF2 is 1. If the binary digit fed to the modulator is 1(B = 1), such digit 1 is applied to the input K2 of flip flop FF2 and to the first input of AND gate G2. Since the second input of AND gate G2 is 1 ($\overline{Q1}$ = 1), flip flop FF2 will change state at the appearance of the clock pulse H and output Q2 will become 0. Since the complement B is 0, the inputs J1 and K1 of flip flop FF1 will be 0 and output Q1 will not change. Therefore, the output of arithmetic adder AA will shift to 0.

The second digit of the binary code being also a digit 1 (B = 1), the flip flop FF2 will change state again at the second clock pulse H and the input + of the adder AA will receive a digit 1. The output Q1 of the flip flop FF1 will not change because the complement $\overline{B}$ is 0 so that the output of the adder will become +.

The third digit of the binary code being 0 ($\overline{B}$ = 1), the flip flop FF1 will receive a digit 1 on its terminal K1. However, AND gate G1 will remain non-conductive because the output $\overline{Q2}$ of flip flop FF2 is 0. Consequently, input J1 of flip flop FF1 will be 0 and thus the output Q1 thereof will be 0. Because B is 0, it will be easily seen that the inputs G2 and K2 of flip flop FF2 will both be 0 and that Q2 will remain at level 1. Thus the output of the adder will be +.

The fourth digit of the binary sequence being 1 (B = 1), the inputs G2 and K2 of flip flop FF2 will both be 1 because $\overline{Q1}$ is also at level 1 and, consequently, Q2 will change state. Thus the input + of the adder will become 0. On the other hand, the inputs J1 and K1 of flip flop FF1 will both the 0 and Q1 will remain at 0. Thus the output of adder AA will be 0.

The fifth digit of the binary sequency being 0 ($\overline{B}$ = 1), flip flop FF1 will receive a digit 1 on both its inputs J1 and K1 because $\overline{Q2}$ is 1 and the output Q1 will change to state 1. The inputs J2 and K2 of flip flop FF2 will be 0 and Q2 will remain unchanged. Therefore, the output of adder AA will be −.

If one follows the above sequence of operation, it will be seen that the circuit of FIG. 4 will convert a binary code such as the one illustrated in the top line of FIG.

5 into a ternary code such as illustrated by the sequence BCT1.

Figure 6:
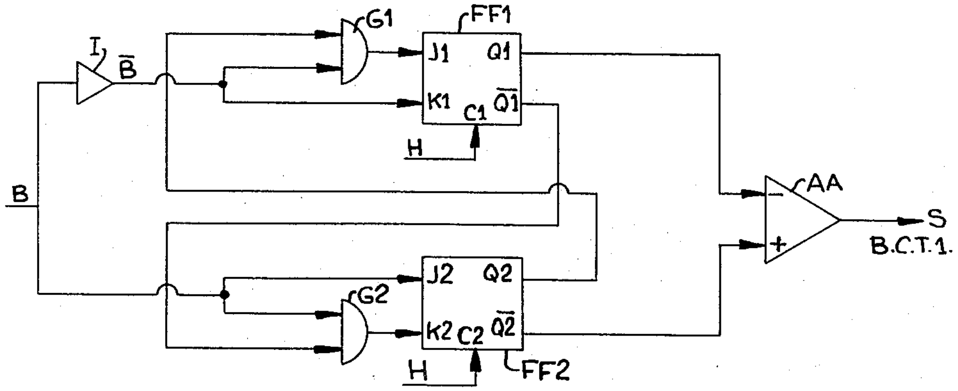
FIGS. 6 to 12 illustrate other embodiments of the modulator in accordance with the invention which are equivalent to the embodiment of FIG. 4.

The circuit of FIG. 4 was obtained by relating equations (1) and (2) above with equation (3). However, due the existence of the complementary logic functions, equation (1) could be related to equation (3) and equation (2) to equation (4). Such would result in a circuit such as illustrated in FIG. 6 of the drawings wherein the input fed to J2 of flip flop FF2 is B whereas the input fed to K2 is $\overline{Q1}$ B. In such circuit the output + of the adder is obviously connected to output $\overline{Q2}$ of flip flop FF2 whereas output Q2 of flip flop FF2 is connected to gate G1.

Figure 7:
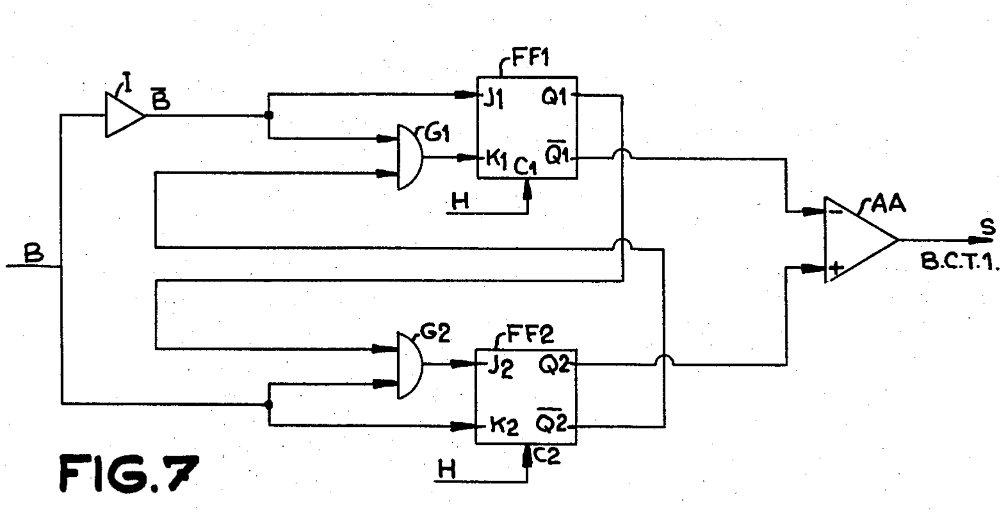

Similarly, equation (1) could be related to equation (4) and equation (2) to equation (3). Such would result in a circuit such as illustrated in FIG. 7 of the drawings wherein the input fed to K1 of flip flop FF1 is $\overline{Q2}$ $\overline{B}$ and the input fed to J1 is $\overline{B}$. The connection of flip flop FF2 is the same as in FIG. 4 except that the input of gate G2 is taken from output Q1 of flip flop FF1 instead of output $\overline{Q1}$. In addition, the input − of the adder is obviously taken from output $\overline{Q1}$ of flip flop FF1.

Figure 8:
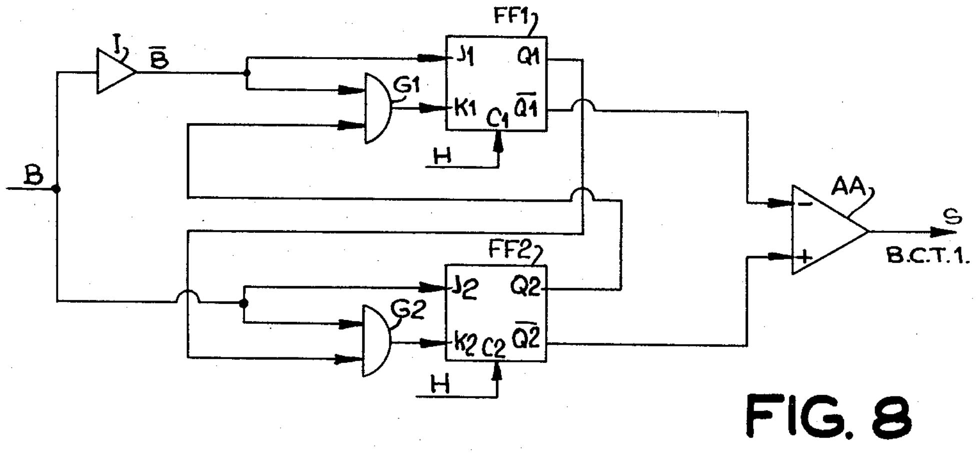

FIG. 8 illustrates a circuit wherein equations (1) and (2) are related to equation (4). In such a circuit, the input J1 of flip flop FF1 is fed with signal $\overline{B}$ whereas the input K1 is fed with the signal $\overline{Q2}$ $\overline{B}$ through gate G1. The input J2 of flip flop FF2 is fed with signal B whereas the input K2 is fed with signal Q1 B through AND gate G2. The output $\overline{Q1}$ of flip flop FF1 and the output $\overline{Q2}$ of flip flop FF2 are fed to the arithmetic adder.

Figure 9:
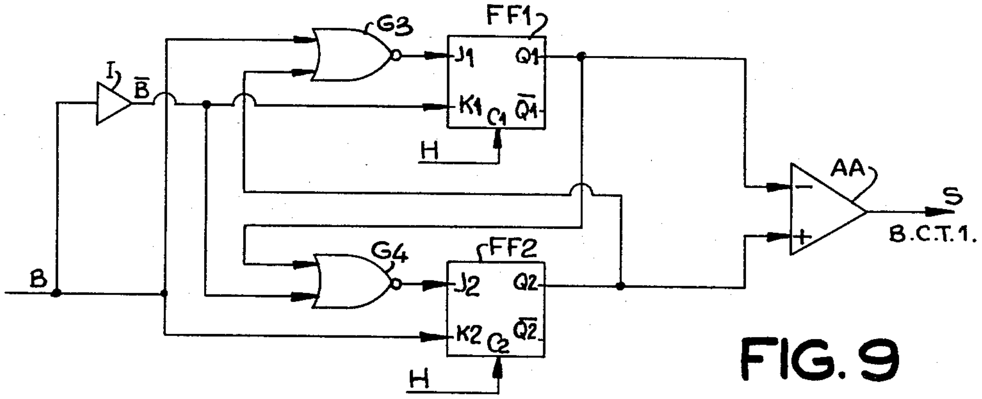
Figure 10:
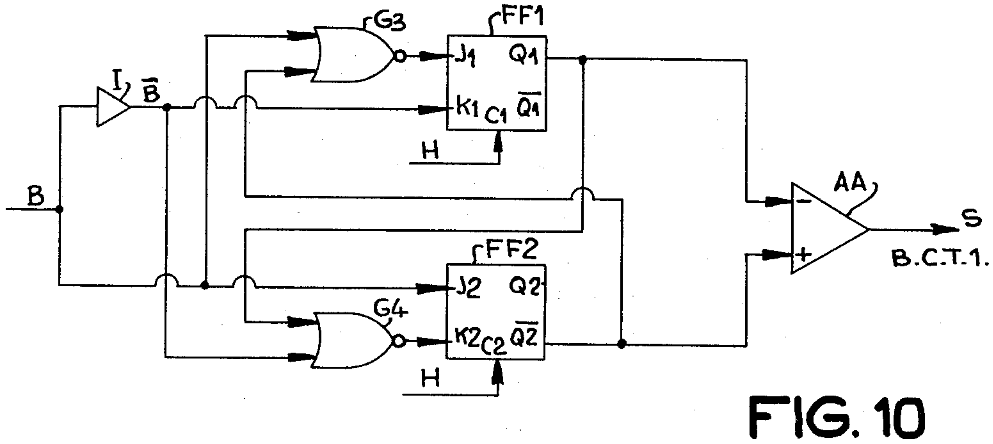
Figure 11:
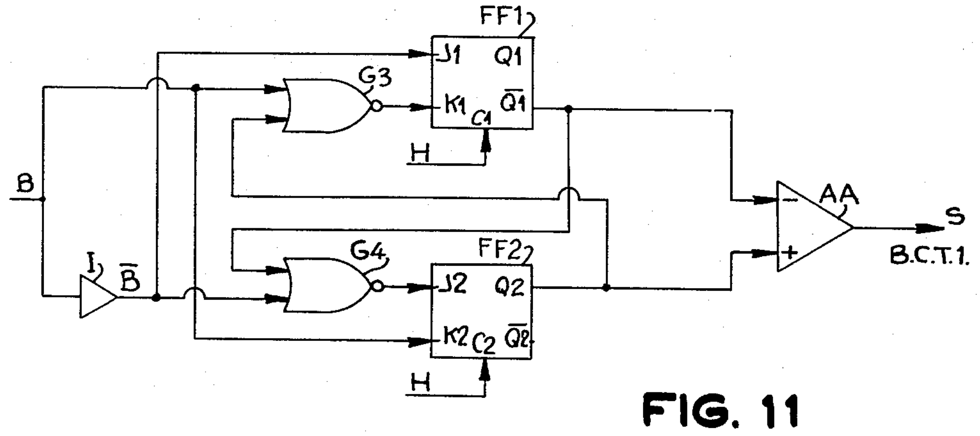
Figure 12:
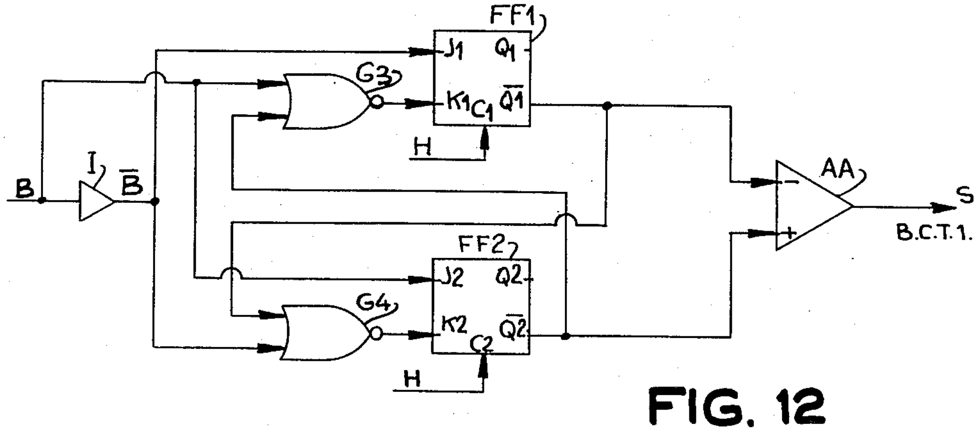

In view of the well-known Morgan logic equation $\bar{a}\,\bar{b} = \overline{a + b}$, the AND gates G1 and G2 of FIG. 4 could be replaced by NOR gates G3 and G4 respectively as illustrated in FIG. 9 provided that the inputs of the NOR gates are replaced by their logic complements. In such a case, NOR gate G3 is fed with binary signal B instead of signal $\overline{B}$ and is connected to output Q2 of flip flop FF2 instead of output $\overline{Q2}$. Similarly, NOR gate G4 is connected to output $\overline{B}$ of logic circuit I instead of being fed with binary signal B and to output Q1 of flip flop FF1 instead of output $\overline{Q1}$. Following the same reasoning, the circuits of FIGS. 10, 11 and 12 are equivalent to the circuits of FIGS. 6, 7 and 8 respectively.

Referring now to the transfer diagram of FIG. 1b, the changes of states may be illustrated in the following table:

| Ternary | Binary 0 | Binary 1 |
|---|---|---|
| 0 | − | + |
| + | 0 | + |
| − | − | 0 |

In order to code the three ternary states +, 0, − in binary form, it is necessary to use two binary variables which will be designated Y1 and Y2 in such a manner that

| | Y1 | Y2 |
|---|---|---|
| 0 = | 0 | 0 |
| + = | 0 | 1 |
| − = | 1 | 0 |

The above table expressed in binary variables will therefore be as follows:

| $Y_{1n}$ $Y_{2n}$ | Binary Ba | 0: $Y_{1n+1}$ | 0: $Y_{2n+1}$ | 1: $Y_{1n+1}$ | 1: $Y_{2n+1}$ |
|---|---|---|---|---|---|
| 0 | 0 | 1 | 0 | 0 | 1 |
| 0 | 1 | 0 | 0 | 0 | 1 |
| 1 | 0 | 1 | 0 | 0 | 0 |

The logic functions of the above tables are as follows:

$$Y_{1n+1} = \overline{Y_{1n}}\ \overline{Y_{2n}}\ \overline{B_n} + Y_{1n}\ \overline{Y_{2n}}\ \overline{B_n}$$

$$Y_{2n+1} = \overline{Y_{1n}}\ \overline{Y_{2n}}\ B_n + \overline{Y_{1n}}\ Y_{2n}\ B_n$$

Taking into consideration the fact that the state 1, 1 does not exist, the above equations may be simplified as follows:

$$Y_{1n+1} = \overline{Y_{2n}}\ \overline{B_n} \quad (5)$$

$$Y_{2n+1} = \overline{Y_{1n}}\ B_n \quad (6)$$

The above functions are very similar to the transfer functions of a flip flop of the D type wherein:

$$Q_{n+1} = D_n \quad (7)$$

$$\overline{Q_{n+1}} = \overline{D_n} \quad (8)$$

Figure 13:
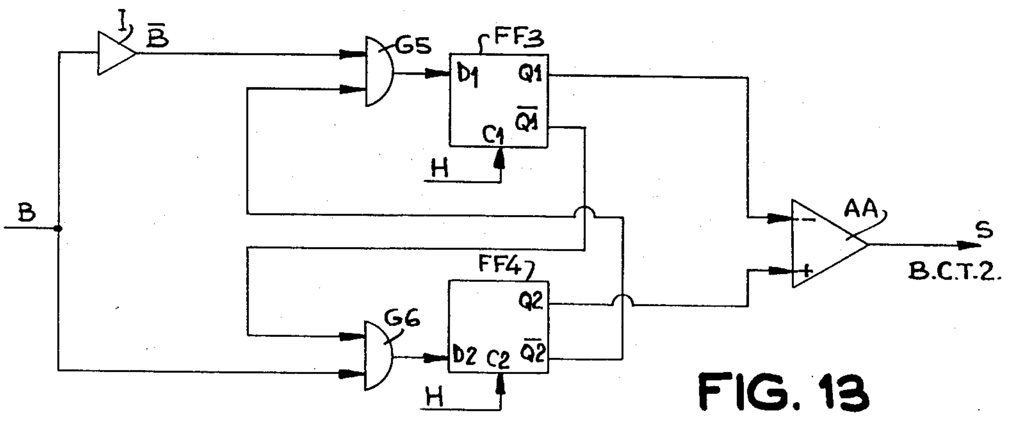
FIG. 13 illustrates a second embodiment of a modulator in accordance with the invention corresponding to the transfer diagram of FIG. 1*b;*

Consequently, the equations (5) and (6) could be solved using two flip flop circuits of the D type, one for each equation, by relating equations (5) and (6) to equation (7). A circuit for performing such operation is illustrated in FIG. 13 and includes a logic inverter circuit I capable of providing a binary sequence $\overline{B}$ which is complementary to the binary signal B. The complementary sequence $\overline{B}$ is fed to the first input of a AND gate G5, the output of which is connected to the input D1 of a flip flop FF3 of the well-known D type. The binary sequence B is fed to the first input of a AND gate G6 the output of which is connected to the input D2 of a flip flop FF4 of the well-known type D. The output $\overline{Q1}$ of the flip flop FF3 is connected to the second input of gate G6 whereas the output $\overline{Q2}$ of flip flop FF4 is connected to the second input of gate G5. The output Q1 of flip flop FF3 is connected to the input − of an adder AA whereas the output Q2 of flip flop FF4 is connected to the input + of the adder AA. The output of the adder AA provides the BCT2 sequences.

In examining the circuit of FIG. 13, it will be seen that equation (5) is related to equation (7) by feeding to the input D1 of flip flop FF3 the signal $\overline{Q_2}$ $\overline{B}$ and by feeding to the input D2 of flip flop FF4 the signal $\overline{Q_1}$ B.

Figure 14:
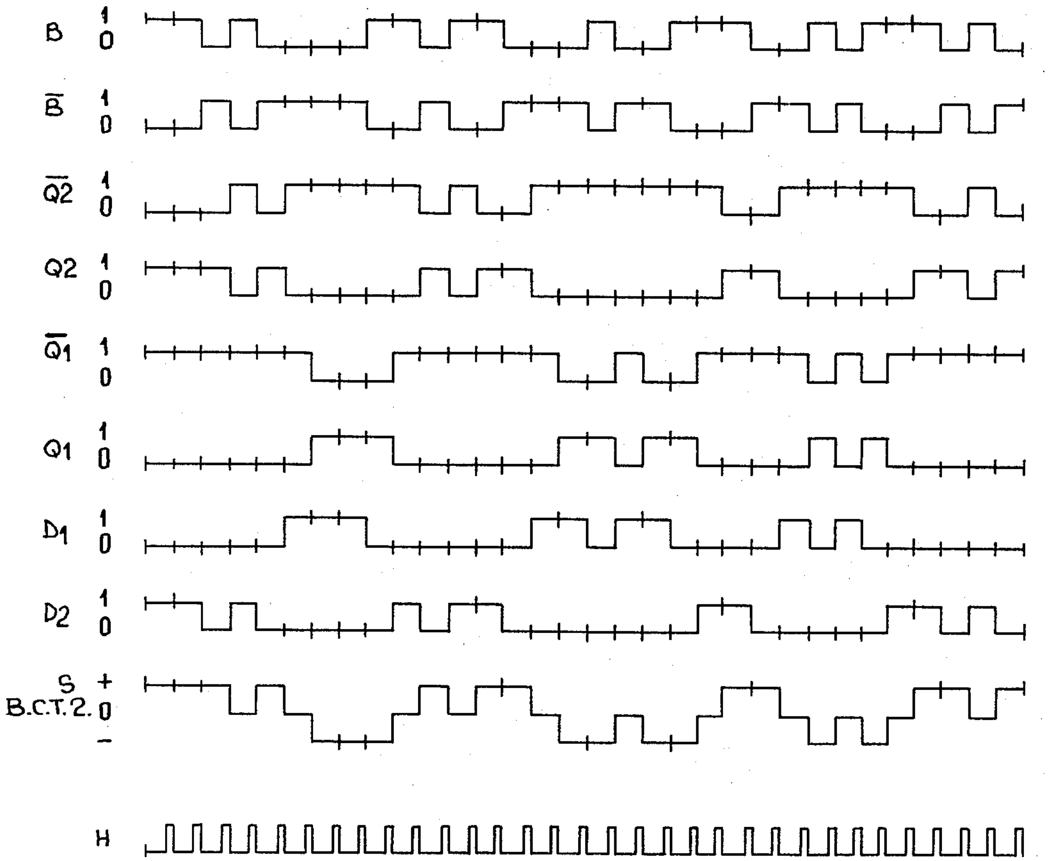
FIG. 14 illustrates the wave forms appearing at various locations of the modulator of FIG. 13.

To verify the above, let us consider the wave form illustrated in FIG. 14 of the drawings assuming that, in the first time slot, the output S of the adder is + and that, consequently, the output Q1 of flip flop FF3 is 0 and the output Q2 of flip flop FF4 is 1. If the first digit fed to the modulator is 1 (B = 1), gate G6 will have a digit 1 on both inputs ($\overline{Q1}$ = 1, B = 1) upon the appearance of the first clock pulse H and, consequently, will feed a digit 1 to input D2 of flip flop FF4. The output Q2 of flip flop FF4 will thus become 1 and such a signal will be applied to input terminal + of adder AA. On the other hand, because B is 0, gate G5 will not conduct and the output Q1 of flip flop FF3 will remain 0. Thus, the output of adder AA will be + as illustrated in the last line of the wave forms of FIG. 14. The second binary digit being also 1, no change will occur at the outputs of flip flops FF3 and FF4 and the output of adder AA will thus remain +.

The third binary digit being 0, the output $\overline{B} = 1$ will be fed to gate G5. However, since $\overline{Q2} = 0$, gate G5 will not conduct and no change will occur at the output of flip flop FF3. The output B = 0 will be fed to gate G6 and such gate will feed a digital signal 0 to flip flop FF4; the output Q2 of flip flop FF4 will thus switch to 0 and the output of adder AA will become 0.

The fourth binary digit being 1, gate G6 will become conductive ($\overline{Q1} = 1$, B = 1) and feed digital signal 1 to input D2 of flip flop FF4. The output Q2 of flip flop FF4 will thus become 1 and the output of adder AA will be 1. In following the above procedure, it will be noted that the binary sequence B of FIG. 14 may be converted into the sequence BCT2 shown in the wave form S illustrated in the same figure under the control of the clock H.

The circuit of FIG. 13 was obtained by relating equations (5) and (6) to equation (7). However, due to the existence of the complementary logic functions, the equation (5) could be related to equation (8) and equation (6) to equation (7). In relating equation (5) with equation (8) $\overline{Y_{2n}\,\overline{B_n}}$ may be changed to $\overline{Y_{2n}} + B_n$ because of the well-known Morgan equation $\overline{a\,b} = \overline{a} + \overline{b}$, and, consequently, the input D1 of flip flop FF3 may be fed with signals B and Q2 through OR gate G7 which replaces AND gate G5. In such a circuit, the input − of the adder AA is fed with the signal appearing at output $\overline{Q1}$ of flip flop FF3 and one of the inputs of gate G6 is fed with the signal appearing at the output Q1 of the same flip flop FF3.

Figure 16:
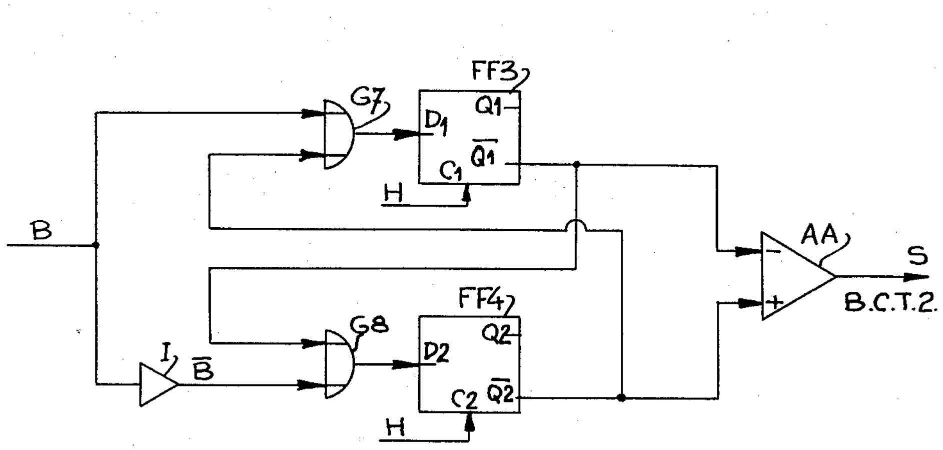

The circuit of FIG. 16 illustrates an arrangement wherein equations (5) and (6) are related to equation (8). Similarly, the circuit of FIG. 17 illustrates an arrangement wherein equation (5) is related to equation (7) whereas equation (6) is related to equation (8).

Figure 18:
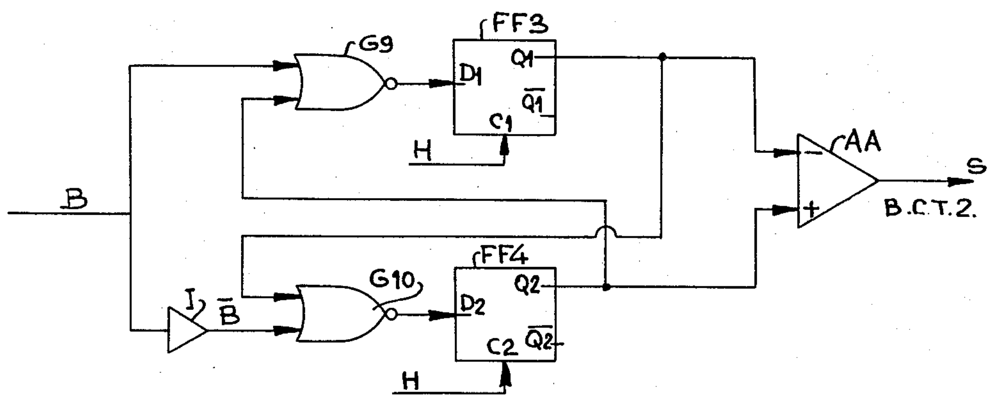

Due to the well-known Morgan equation $\overline{a\,b} = \overline{a} + \overline{b}$, the AND gates G5 and G6 of FIG. 13 could be replaced by NOR gates G9 and G10 as illustrated in FIG. 18. Of course, the inputs of the NOR gates G9 and G10 would have to be replaced by their complements.

Figure 15:
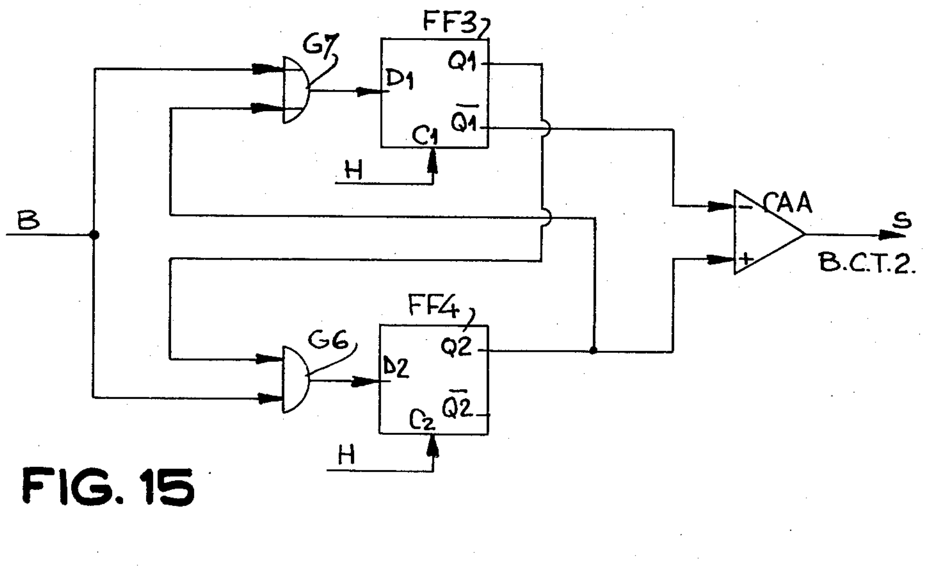
FIGS. 15 to 21 illustrate other embodiments equivalent to the modulator of FIG. 13.
Figure 19:
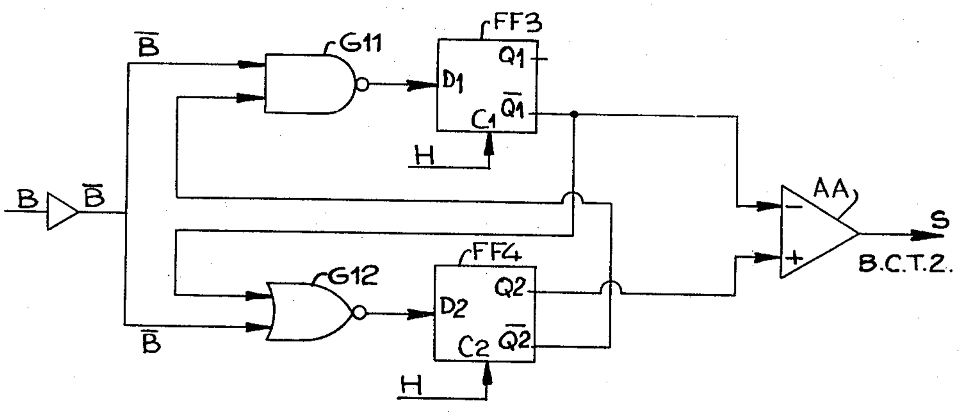

FIG. 19 illustrates a circuit which is the equivalent to the one shown in FIG. 15, wherein AND gate G6 has been replaced by NOR gate G12 and OR gate G7 replaced by NAND gate G11. The replacement of OR gate G7 by NAND gate G11 results from the well-known Morgan equation $\overline{a\,b} = \overline{a} + \overline{b}$. Of course, the inputs of gate G11 are the complements of the inputs of gate G7.

Figure 17:
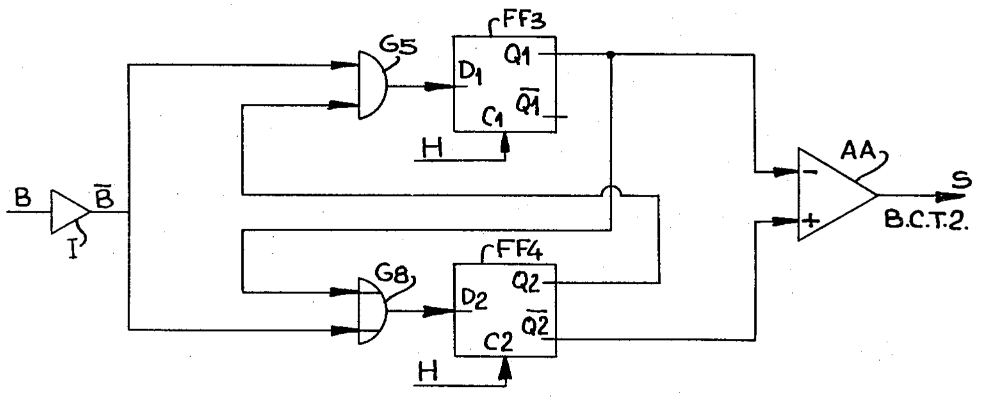
Figure 20:
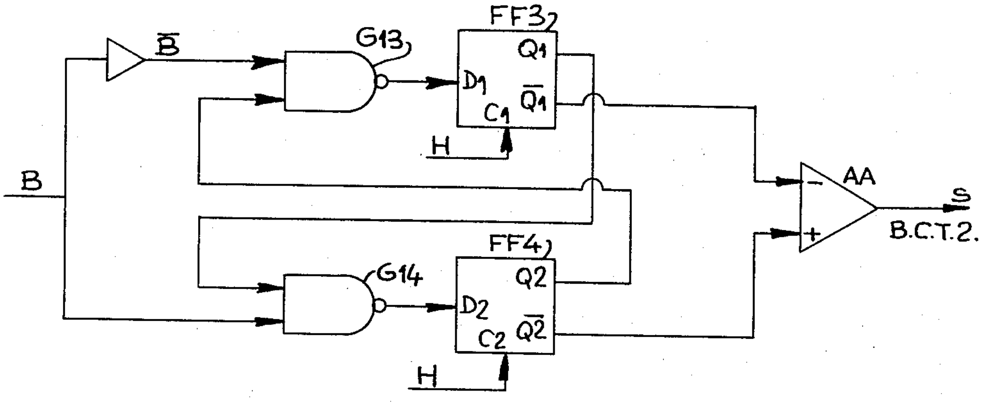
Figure 21:
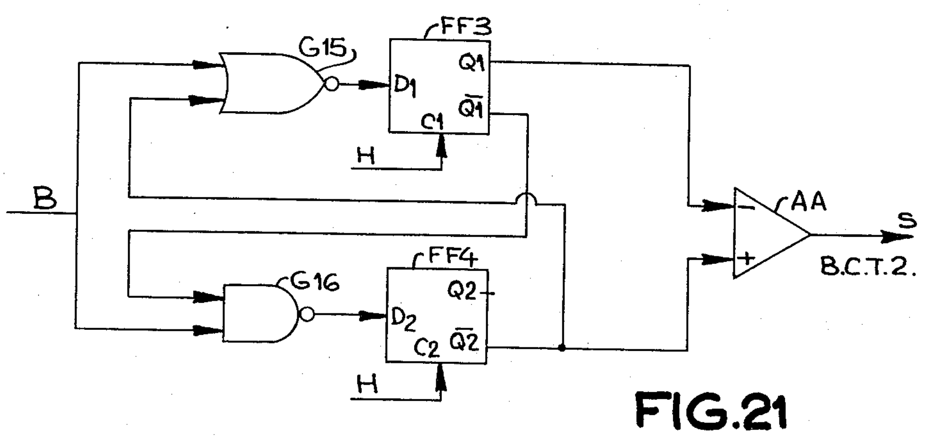

Following the same reasoning, the modulators of FIGS. 20 and 21 are equivalent to the modulators of FIGS. 16 and 17 respectively. In FIG. 20, OR gates G7 and G8 have been replaced by NAND gates G13 and G14 whereas, in FIG. 21, AND gate G5 has been replaced by NOR gate G15 and OR gate G8 has been replaced by NAND gate G16.

The above-described modulators are associated at the receiving end of the transmission line, with demodulators for converting the ternary code back into the original binary code. Theoritically, the operation to be performed is the reverse of the one illustrated in the transfer diagrams of FIGS. 1*a* and 1*b* and are illustrated in the following truth table:

| $BCT_1$ | INPUT | BINARY OUTPUT |
|---|---|---|
| *n*−1 | *n* | *m* |
| + | + | 0 |
| + | 0 | 1 |
| − | − | 1 |
| − | 0 | 0 |
| 0 | + | 1 |
| 0 | − | 0 |

Figure 22:
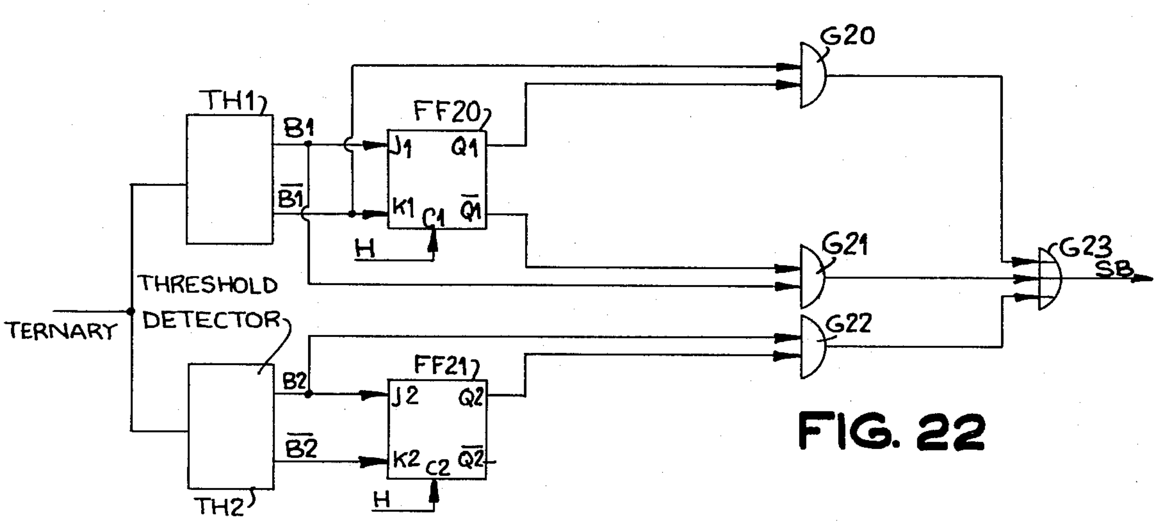
FIG. 22 illustrates an embodiment of a demodulator for the modulator illustrated in FIG. 4 of the drawings.

FIG. 22 illustrates a circuit diagram of a demodulator capable of converting a BCT1 code back into a binary code in accordance with the above truth table. Such diagram includes two threshold detectors TH1 and TH2. Threshold detector TH1 generates a binary signal B1 of level 1 when the ternary signal fed thereto is positive and a binary signal of level 0 when the ternary signal fed thereto is 0 or negative. Threshold detector TH2 generates a binary signal B2 of level 1 when the ternary signal fed thereto is negative and a binary signal of level 0 when the ternary signal fed thereto is 0 or positive. The threshold detectors also generate the logic complements $\overline{B1}$ and $\overline{B2}$ of signals B1 and B2 respectively. The outputs B1 and $\overline{B1}$ of threshold detector TH1 are fed to inputs J1 and K1 respectively of a flip flop FF20 of the well-known JK type while the outputs B2 and $\overline{B2}$ of threshold detector TH2 are fed to inputs J2 and K2 of a flip flop FF21 also of the JK type. The output Q1 of flip flop FF20 is fed to a first input of an AND gate G20 whereas the output $\overline{Q1}$ of the same flip flop is connected to a first input of an AND gate G21. The second input of gate G20 is connected to output $\overline{B1}$ of threshold detector TH1 while the second input of gate G21 is connected to output B1 of threshold detector TH1. The output Q2 of flip flop FF21 is connected to a AND gate G22. The second input of gate G22 is connected to output B2 of threshold detector TH2. Finally, the output of gates G20, G21 and G22 are connected to OR gate G23.

Figure 23:
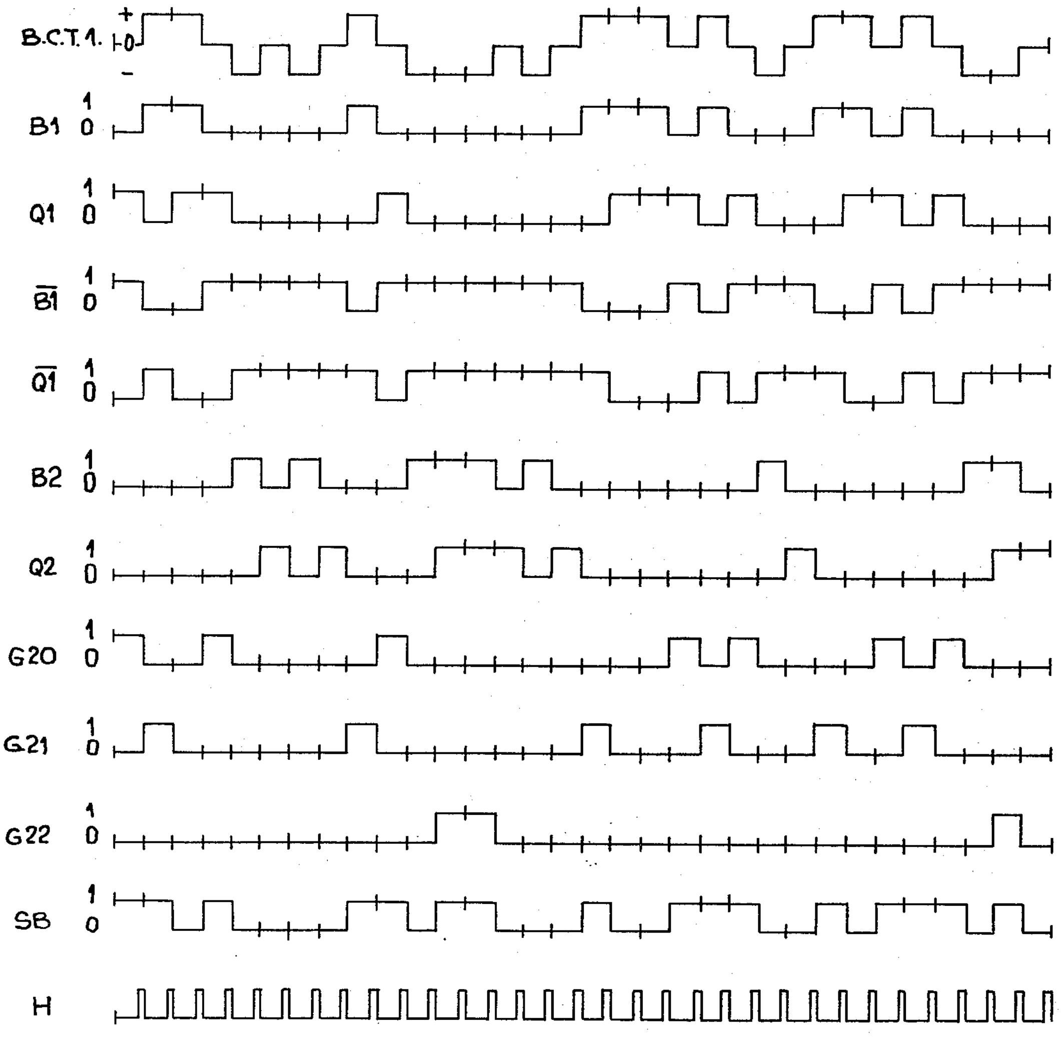
FIG. 23 illustrates the various wave forms appearing in the demodulator of FIG. 22.

In examining the wave forms of FIG. 23 it will be seen that the demodulator of FIG. 22 converts a ternary signal such as illustrated in the top line of FIG. 23 into a binary signal SB such as illustrated in the line before last of the wave forms of FIG. 23. Let us assume that the state of the ternary code is 0 that the output Q1 of flip flop FF20 is 1, and that the output Q2 of flip flop FF21 is 0 prior to the appearance of the first clock pulse as illustrated in FIG. 23 of the drawings. The first digit of the BCT1 code being 0, outputs B1 and B2 of threshold detectors TH1 and TH2 will be 0 whereas outputs $\overline{B1}$ and $\overline{B2}$ will be 1. Under these conditions, gate G20 only will conduct and provide a digital signal 1 at the input of OR gate G23. Consequently, a binary output SB = 1 will appear at the output of gate G23.

Upon the appearance of the first clock pulse H, the output of flip flop FF20 will switch to 0 and output Q2 of flip flops FF21 will remain at 0 and, consequently, gates G20 and G22 will not conduct. However, gate G21 will have a digit 1 fed to one terminal and when the second digit of the BCT1 code which is a + arrives at the input of threshold detector TH1, gate G21 will become conductive because B1 = 1 and, consequently, a digit 1 will be fed to OR gate B33 and appear at the output of OR gate G23. Thus the binary output SB will be 1.

The appearance of the signal B1 = 1 on input J1 of flip flop FF20 will shift the output Q1 thereof to state 1 at the second clock pulse to feed a digit 1 to gate G20 whereas gates G21 and G22 will be blocked; the first one because $\overline{Q1} = 0$ and the second one because B2 = 0. The third digit of the BCT1 code being 1, the signal $\overline{B1} = 0$ will be fed to AND gate G20 and such gate will not conduct. Thus the output SB of OR gate G23 will be 0.

Upon the appearance of the third clock pulse, the output Q1 and Q2 will remain unchanged (Q1 = 1, Q2 = 0) and gate G20 will be the only one of gates G20 to G22 which will have a digit 1 applied to one of its terminal. The fourth digit of the BCT1 code being 0, signal $\overline{B1} = 1$ will render gate 20 conductive and the binary output SB will be 1. In following the above sequence, it will be seen that the BCT1 code illustrated in the first line of FIG. 23 is converted into the binary code SB illustrated in the line before last of the same figure.

Figures 24, 25, 26:
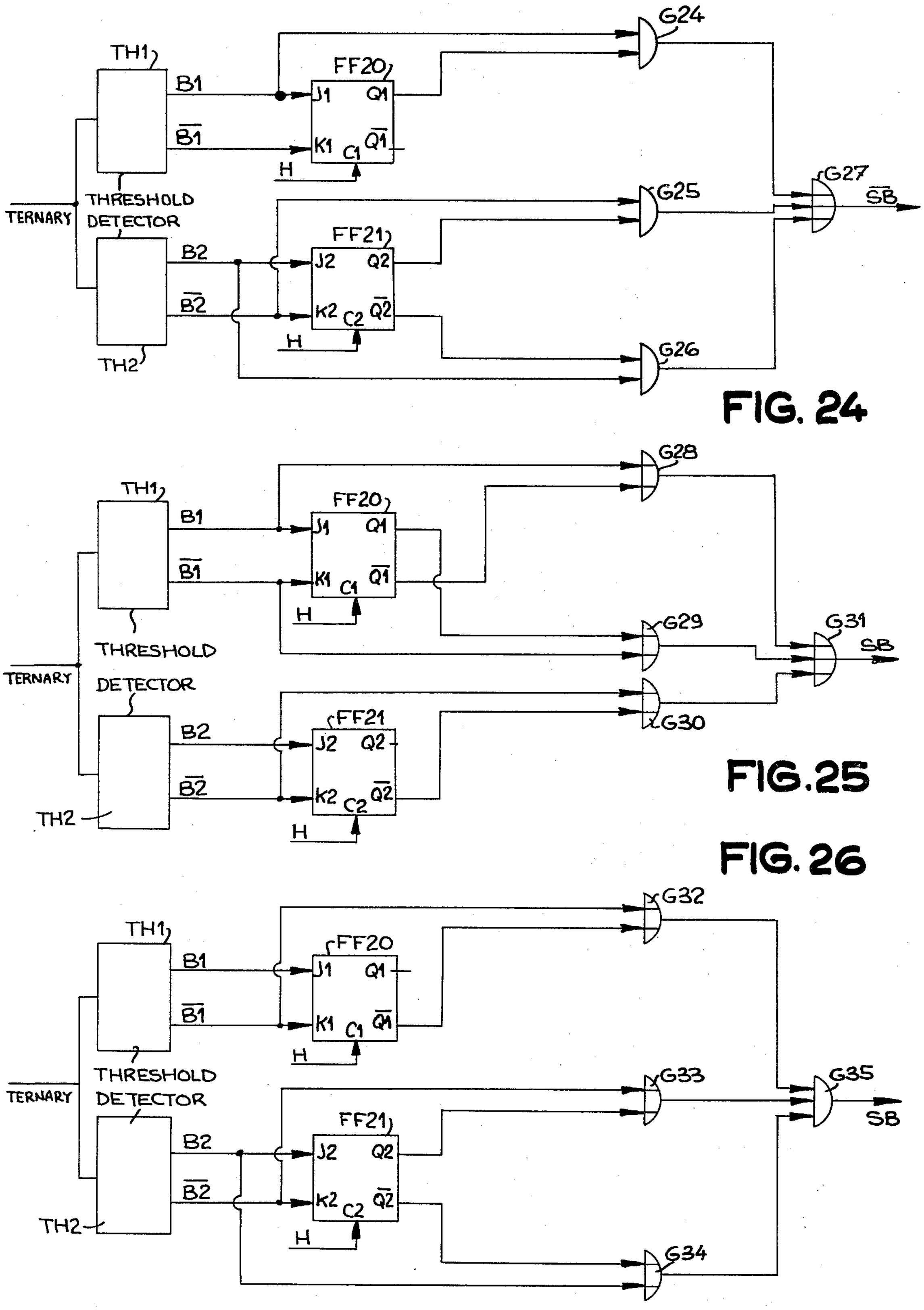
FIGS. 24 to 30 illustrate alternative embodiments of the modulator of FIG. 22.

FIG. 24 illustrates another embodiment of a demodulator which will convert a ternary BCT1 code into a binary code in accordance with the above-mentioned truth table except that the output SB will be the complement of the corresponding output of the demodulator of FIG. 22. The circuit diagram of FIG. 24 includes the same elements as the one of FIG. 22 except that gates G20 to G22 are replaced by AND gates G24 to G26 and gates G23 by OR gate G27 which is connected to the output of AND gates G24 to G26. The inputs of gate G24 are taken from the input J1 of flip flop FF20 and from the output Q1 of the same flip flop. The inputs of AND gate G25 are taken from the input K2 to flip flop. The inputs of AND gate G26 are taken from the input J2 of flip flop FF21 and the output $\overline{Q2}$ of the same flip flop. In repeating the above operation for the circuit of FIG. 24 it will be easily seen that such circuit satisfies the above-mentioned truth table except that the binary outputs are the complements of the ones of the table.

A third embodiment of a demodulator is illustrated in FIG. 25. Such embodiment includes the same elements as the ones of FIG. 22 except that AND gates G20 to G22 are replaced by OR gates G28 to G30 and that OR gate G23 is replaced by AND gate G31. The output of AND gate G31 is the complement of the output of OR gate G23. The inputs of OR gate G28 are connected to the input J1 of flip flop FF20 and to the output $\overline{Q1}$ of the same flip flop. The inputs of OR gate G29 are connected to the input K1 of flip flop FF20 and to the output Q1 of the same flip flop. The inputs of OR gate G30 are connected to the input K2 of flip flop FF21 and to the output $\overline{Q2}$ of the same flip flop. The outputs of OR gates G28 to G30 are connected to the input of AND gate G31, It will be easily seen that the circuit of FIG. 25 performs the operation of the above truth table except that the binary outputs are the complements of the ones of the table.

FIG. 26 illustrates a fourth embodiment of a demodulator capable of performing the conversion of the above-mentioned truth table. Such embodiment includes the same elements as the embodiment of FIG. 22 except that AND gates G20 to G22 have been replaced by OR gates G32 to G34 and that OR gate G23 has been replaced by AND gate G35 which is connected to the output of OR gates G32 to G34. The inputs of OR gate G32 are connected to the input K1 of flip flop FF20 and to the output $\overline{Q1}$ of the same flip flop. The inputs of OR gate G33 are connected to the input K2 of flip flop FF21 and to the output Q2 of the same flip flop. The inputs of OR gate G34 are connected tothe input J2 of flip flop FF21 and to the output $\overline{Q2}$ of the same flip flop. It will be easily seen that the above circuit performs the same operation as the above-mentioned truth table.

Figure 27:
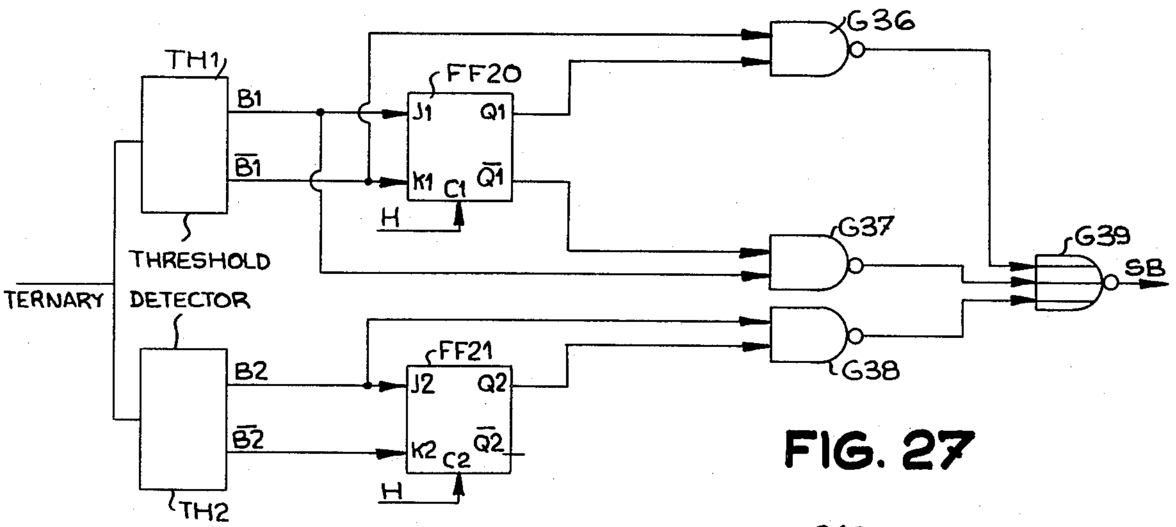

Referring now to FIG. 27, it will be seen that the demodulator of FIG. 22 may be realized by replacing AND gate G20 to G22 by NAND gates G36 to G38 except that the outputs of gates G36 to G38 will be the complement of the outputs of AND gates G20 to G22. Based on the Morgan equation $\overline{a\,b} = \overline{a} + \overline{b}$, a NAND gate G39 may be used instead of OR gate G23 to provide the same output SB at the output of the circuit. Consequently, the circuit of FIG. 27 is equivalent to the circuit of FIG. 22.

Figure 28:
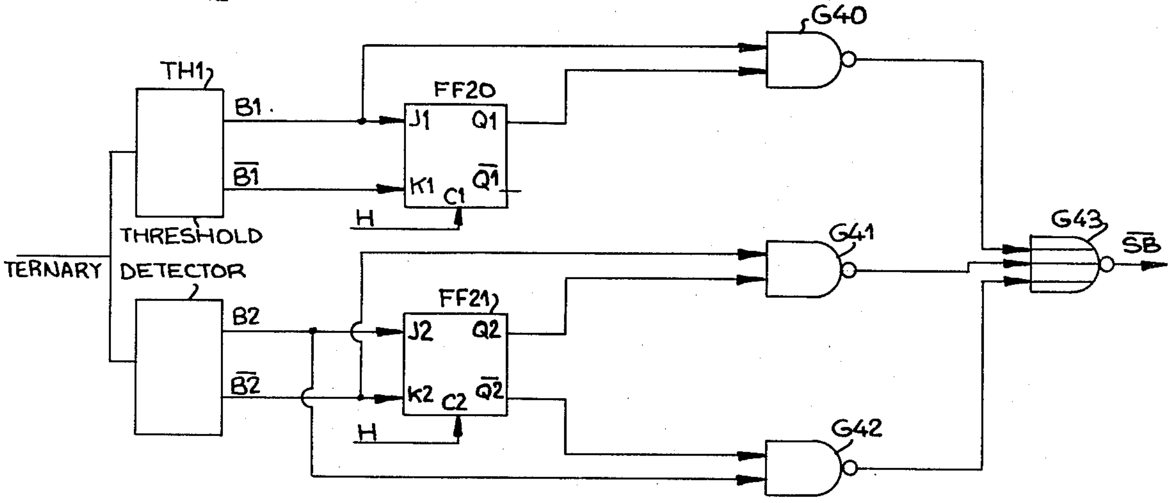

Following the same reasoning, the circuit of FIG. 24 may be realized in practice by the circuit of FIG. 28 wherein NAND gates G40 to G42 are used instead of OR gate G27.

Figure 29:
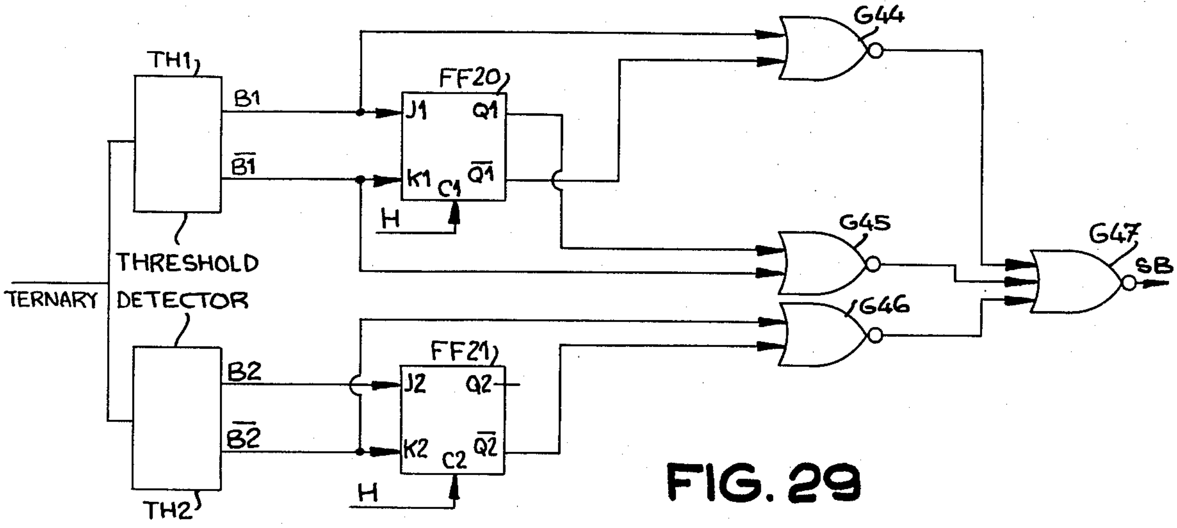

The demodulator of FIG. 25 may be realized in practice by the circuit of FIG. 29 by using NOR gates G44 to G46 instead of OR gates G28 to G30 except that the output of Gates G44 to G46 will be the logic complement of the corresponding outputs of gates G28 to G30. Based on the Morgan equation $\overline{a + b} = \overline{a}\,\overline{b}$, NOR gates G47 may replaced AND gate G31 and take into consideration the fact that the inputs of gate G47 are the complement of what they should be. Consequently, the outputs $\overline{SB}$ of NOR gate G47 will be the same as the corresponding output of gate AND G31.

Figures 30, 31, 33:
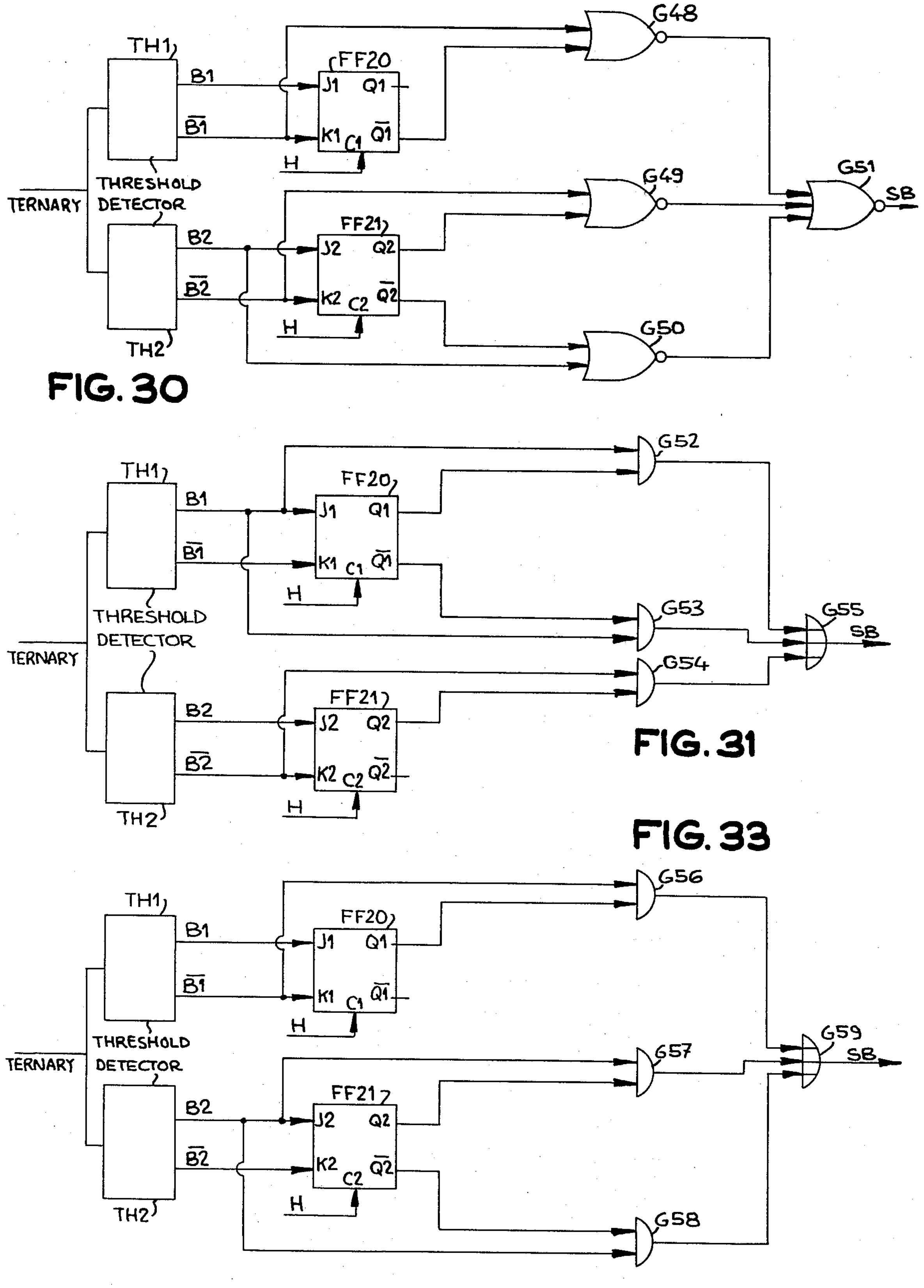
FIG. 31 illustrates a demodulator for use with the modulator of FIG. 13.
FIGS. 33 to 39 illustrate alternative embodiments of the demodulator of FIG. 31.

Following the same reasoning, the circuit of FIG. 26 may be realized in practice by the one of FIG. 30 using NOR gates G48 to G50 instead of OR gates G32 to G34 and NOR gate G51 instead of AND gate G35.

In examining the circuit of FIG. 1*b*, it will be easily noticed that the transformation of a BCT2 code back into a binary code is done by examining two successive BCT codes in accordance with the following truth table:

| BCT2 | INPUT | BINARY OUTPUT |
|---|---|---|
| $n-1$ | $n$ | $m$ |
| + | + | 1 |
| + | 0 | 0 |
| − | − | 0 |
| − | 0 | 1 |
| 0 | + | 1 |
| 0 | − | 0 |

FIG. 31 illustrates the circuit diagram of a demodulator capable of converting a BCT2 code back into a binary code. Such diagram includes two threshold detectors TH1 and TH2 and two JK flip flops FF20 and FF21 which are of the same type as the ones illustrated with the demodulators used for converting the BCT1 code into a binary code. The threshold detectors TH1 and TH2 are also of the same type as the above demodulators and have been designated by the same reference numerals. The outputs of the threshold detectors TH1 and TH2 are connected to the inputs of the flipflops FF1 and FF2 in the same way as with the BCT1 demodulators. The output $\overline{Q1}$ of flip flop FF20 is connected to one input of a AND gate G52 which has its other input connected to the output B1 of the threshold detector TH1. The output Q1 of flip flop FF20 is connected to one input of an AND gate G53 which has his other input connected to the output B1 of threshold detector TH1. The output Q2 of flip flop FF21 is connected to one input of a AND gate G54 which has its other input connected to the output $\overline{B2}$ of threshold detector TH2. The outputs of gates G52 to G54 are connected to OR gate G55. The binary code SB appears at the output of gate G55.

Figure 32:
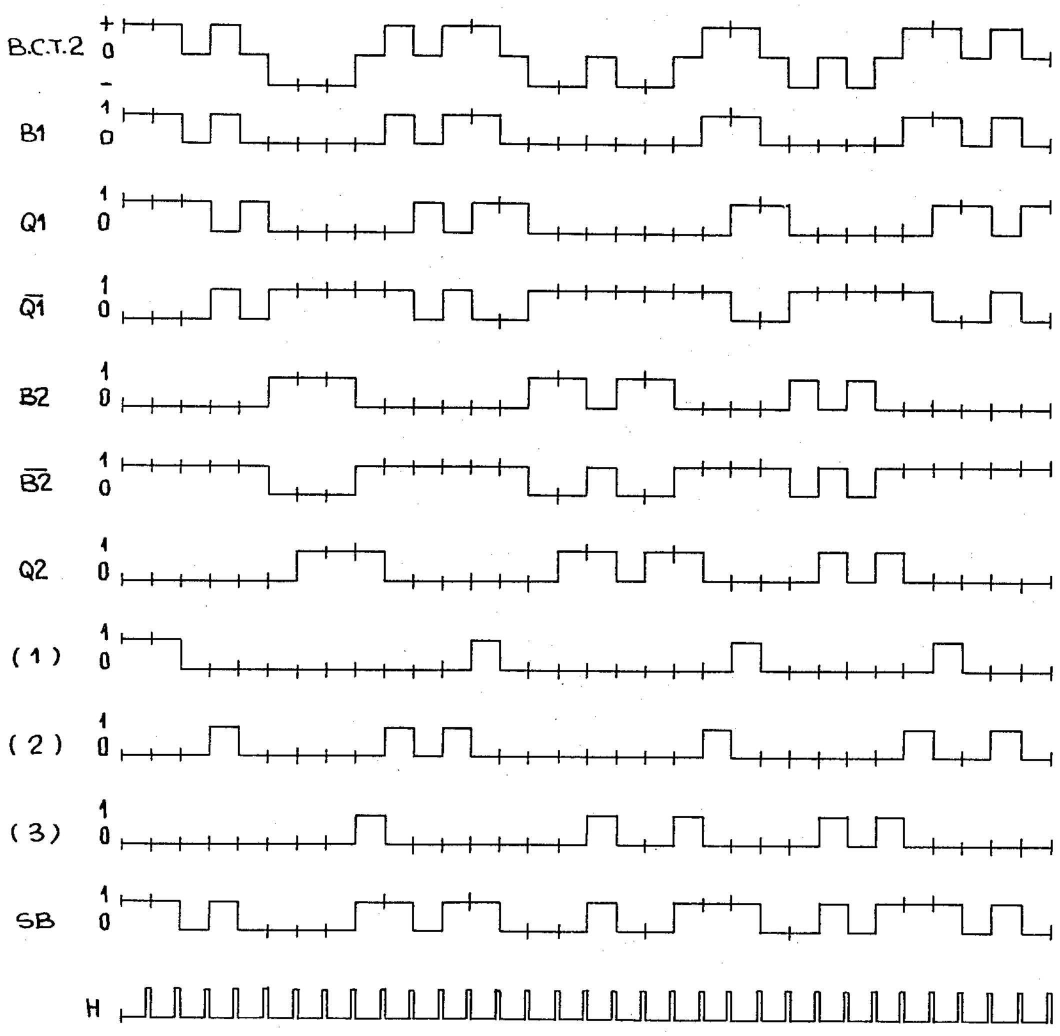
FIG. 32 illustrates the wave forms appearing at various locations in the circuit of FIG. 31.

Referring to FIG. 32 it will be seen that the circuit of FIG. 31 is capable of converting the BCT2 code illustrated in the first wave form of FIG. 32 into a binary code illustrated in the one before last wave form of the same figure. Let us assume that the first state of the BCT2 code is + and that the output Q1 of flip flop FF20 is 1 and the output Q2 of flip flop FF21 is 0 prior to the appearance of the first clock pulse. The BCT2 code being 1, the output B1 of the first threshold detector TH1 will be 1 and the output B2 of the second threshold detector TH2 will be 0. Therefore, the output of AND gate G52 will be 1 and the output of AND gates G53 and G54 will be 0. Therefore, the output SB of OR gate G55 will be 1.

Upon the appearance of the first clock pulse H, outputs Q1 of flip flop FF20 and Q2 of flip flop FF21 will remain unchanged (J1 = 1, K1 = 0, J2 = 0, K2 = 1). The second BCT2 digit shown in FIG. 2 being also a +, there will be no change on the output SB of OR gate G55.

Upon the appearance of the second clock pulse, the output Q1 of flip flop FF20 and Q2 of flip flop FF21 will remain Q1 = 1, Q2 = 0 respectively. Upon the appearance of a BCT2 digit 0 in the third time slot, outputs B1 and B2 will be 0 and since Q2 is also 0 the output of AND gates G52 to G54 will be 0. Consequently, the output SB of OR gate G55 will also be 0.

Upon the appearance of the third clock pulse, the outputs Q1 and Q2 of flip flops FF20 and FF21 respectively will become 0. The fourth digit of the BCT2 code being a +, the output B1 of threshold detector TH1 will be 1 and the output B2 of threshold detector TH2 will be 0. Therefore, the output of AND gate G53 will be 1 and the output SB of OR gate G55 will also be 1.

If the above procedure is followed, it will be seen that the circuit of FIG. 31 is capable of converting a BCT2 code such as illustrated in the first wave form of FIG. 32 into a binary code such as illustrated in the line before last of the same figure.

FIG. 33 illustrates an alternative embodiment of the demodulator of FIG. 31 which is capable of performing the conversion of the above truth table. The circuit of FIG. F33 contains the same elements as the ones of FIGS. F31 except that AND gates G52 to G54 have been replaced by AND gates G56 to G58 whereas OR gate G55 has been replaced by OR gate G59. The inputs of AND gate G56 are connected to the input K1 of flip flop FF20 and to the output Q1 of the same flip flop. The inputs of AND gate G57 are connected to the input J2 of flip flop FF21 and to the output Q2 of the same flip flop. The inputs of AND gate G58 are connected to the input J2 of flip flop FF21 and to the output $\overline{Q2}$ of the same flip flop. The outputs of AND gates G56 to G58 are connected to the input of OR gate G59. It will be easily seen that the circuit of FIG. 33 performs the same logic operation as shown in the above truth table except that the binary outputs are the complements of the ones of the table.

Figure 34:
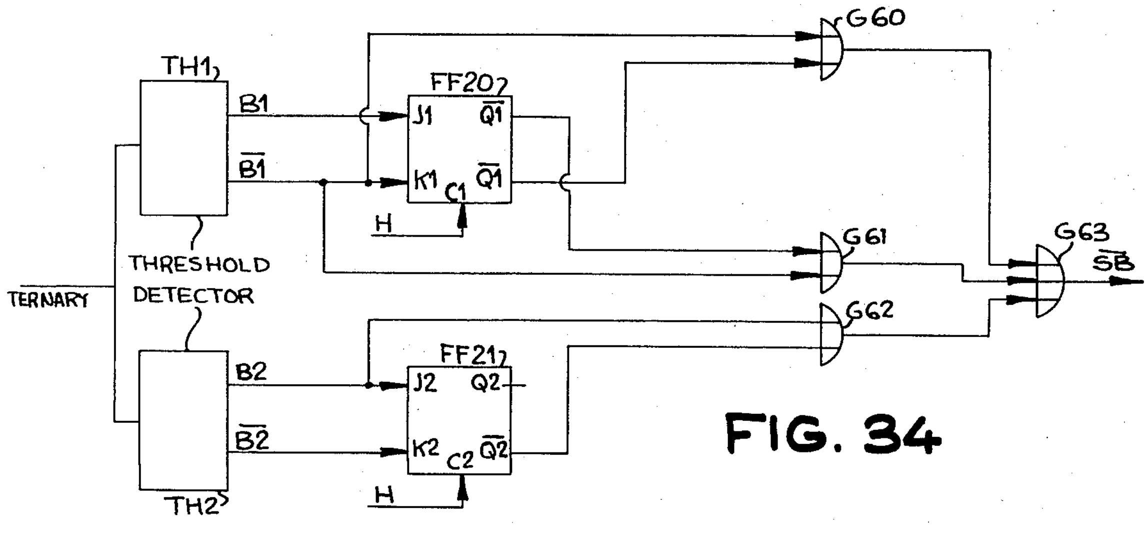

Another embodiment of the demodulator of FIG. 31 is shown in FIG. 34. In such embodiment, AND gates G52 to G54 have been replaced by OR gates G60 to G62. In addition, OR gate G55 has been replaced by AND gate G63. The inputs of OR gate G60 are connected to the input K1 of flip flop FF20 and to the output $\overline{Q1}$ of the same flip flop. The inputs of OR gate G61 are connected to the input K1 of flip flop FF20 and to the output Q1 of the same flip flop. The inputs of OR gate G62 are connected to the input J2 of flip flop FF21 and to the output $\overline{Q2}$ of the same flip flop. The outputs of OR gates G60 to G62 are connected to the input of AND gate G63. It will be seen that the circuit of FIG. 34 performs the operation illustrated in the above truth table except that the input of AND gate G63 is the complement of the one shown in the table.

Figure 35:
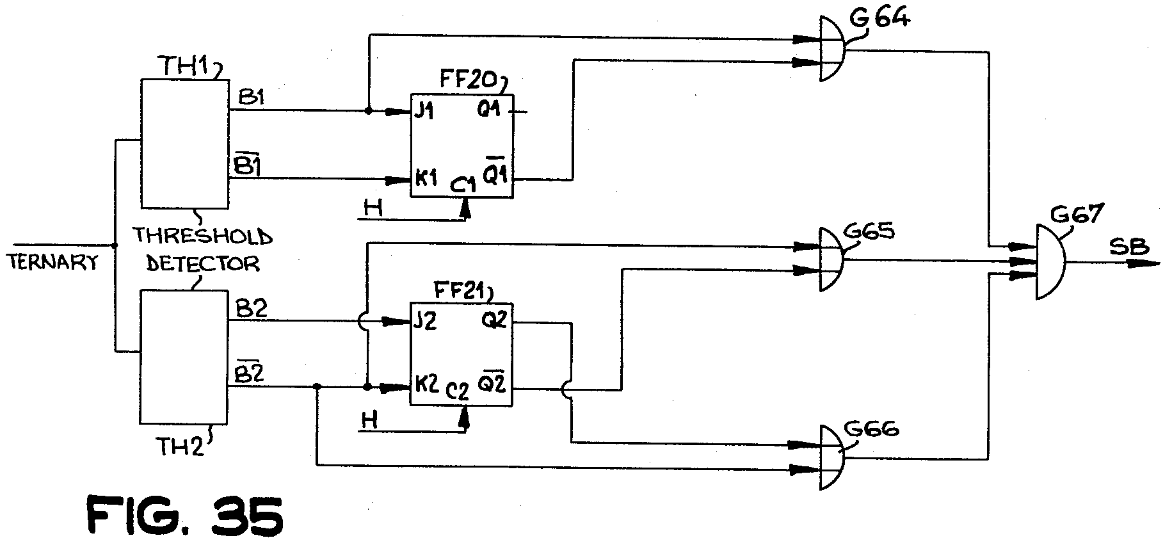

FIG. 35 illustrates another alternative embodiment of the demodulator shown in FIG. 31. Such demodulator includes the same elements except that OR gates G64 to G66 are used instead of AND gates G52 to G54 and that AND gate G67 is used instead of OR gate G55. The inputs of OR gate G64 are connected to the input J1 of flip flop FF20 and to the output $\overline{Q1}$ of the same flip flop. The inputs of OR gate G65 are connected to the input K2 of flip flop FF21 and output $\overline{Q2}$ of the same flip flop. The inputs of OR gate G66 are connected to the input K2 of flip flop FF21 and to the output Q2 of the same flip flop. The outputs of OR gates G64 to G66 are connected to input of AND gate G67. The circuit diagram of FIG. 35 performs a conversion shown in the above truth table.

Figures 36, 37:
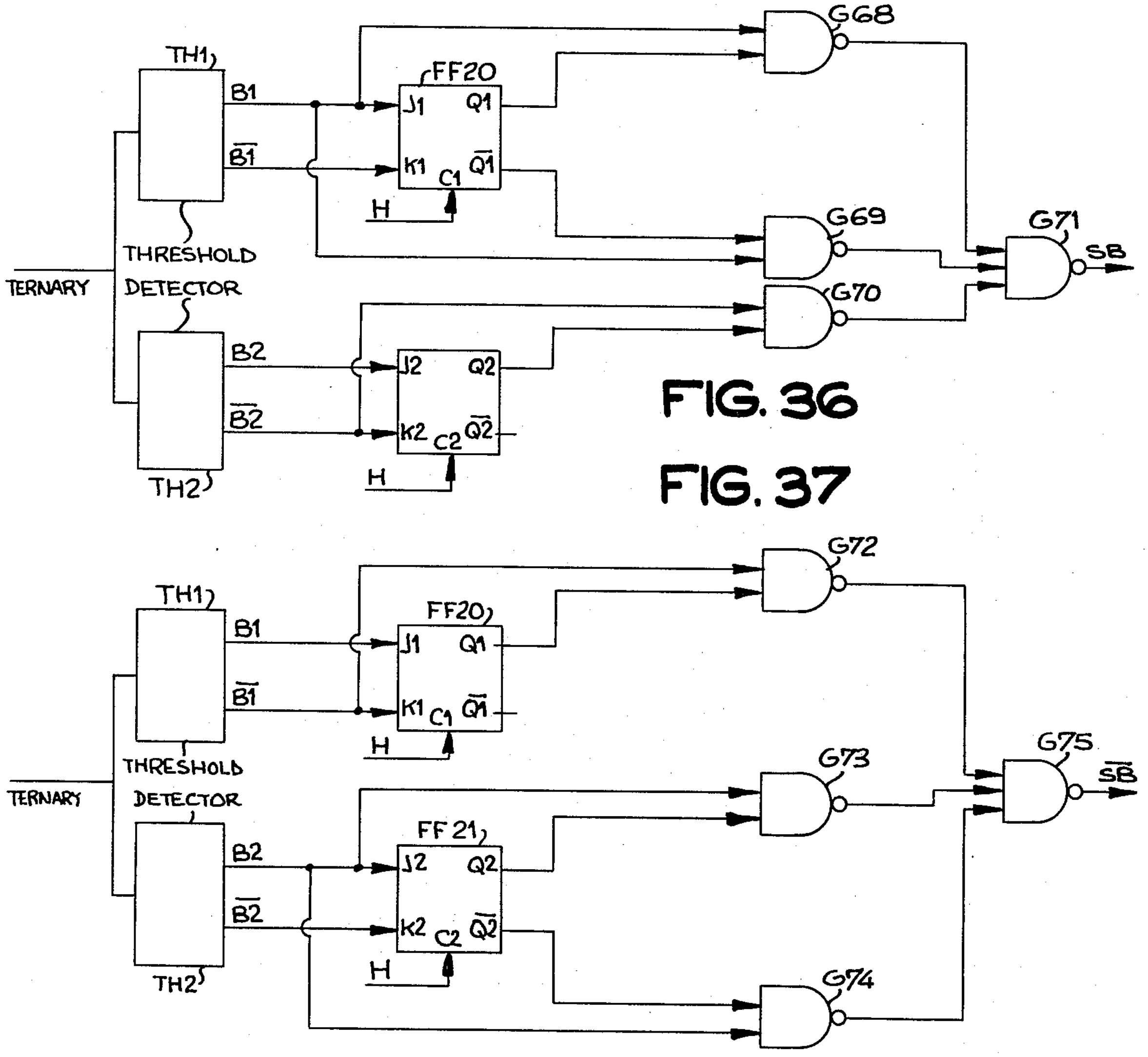

The circuit of FIG. 31 may be realized in practive with the gates of FIG. 36 by replacing AND gates G52 to G54 by NAND gates G68 to G70 except that the outputs of gates G68 to G70 will be the complement of the outputs of gates G52 to G54. However, in accordance with the Morgan equation $\overline{a\ b} = \overline{a + b}$, the OR gate G55 may be replaced by a NAND gate G71 so as to provide an output SB identical to the one of FIG. 31.

Following the same reasoning, the circuit of FIG. 33 could be realized in practice with the gates of FIG. 37 using NAND gates G72 to G74 instead of AND gates G56 to G58 and NAND gate G75 instead of OR gate G59.

Figure 38:
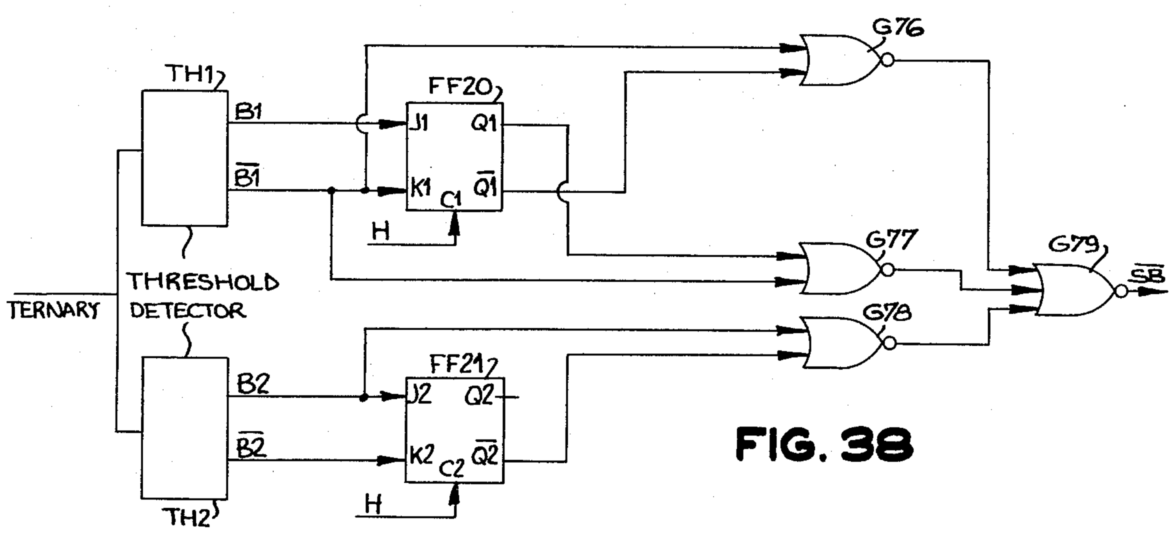

The circuit of FIG. 38 is equivalent to the one of FIG. 34 except that NOR gates G76 to G78 are used instead of OR gates G60 to G62. The complement of the output of OR gates G60 to G62 appears at the output of NOR gates G76 to G78 and such complement is applied to NOR gate G79 used instead of AND gate G63 of FIG. 34. In view of the Morgan equation $\overline{a} + \overline{b} = \overline{a}\ \overline{b}$, it will be seen that the output $\overline{SB}$ of the circuit of FIG. 38 is identical to the corresponding output of the circuit of FIG. 34.

Figure 39:
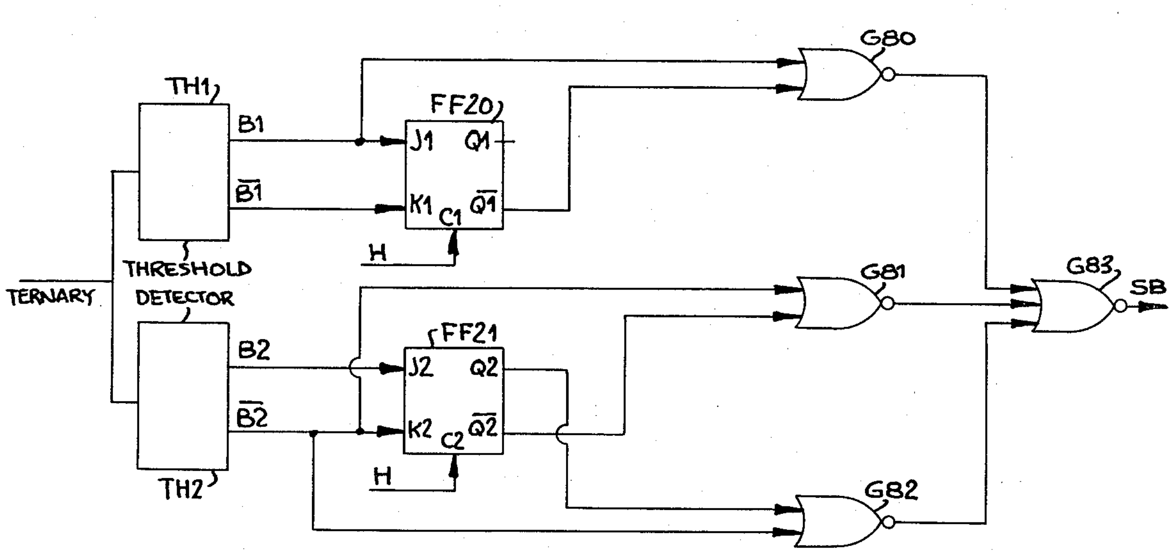

Following the same reasoning, the circuit of FIG. 39 is rendered equivalent to the one of FIG. 35 by replacing OR gates G64 to G66 by NOR gates G80 to G82 and AND gate G67 by NOR gate G83.

If one follows the coding rules illustrated in FIGS. 1*a* and 1*b*, it has been noted that there are three impossible states for both the BCT1 and BCT2 codes as illustrated in FIGS. 3a to 3c of the drawings. Such states are:

a. a ternary + followed by a ternary − as illustrated in FIG. 3a;

b. a ternary − followed by a ternary + as illustrated in FIG. 3b; and c. two consecutive ternary 0 as illustrated in FIG. 3c.

The detection of such errors at the receiving end of the transmission line may be easily done by simple detection circuits as illustrated in FIGS. 40a, 40b and 40c which may be used with both types of demodulators disclosed in FIGS. 22 to 39. The circuit of FIG. 40a may be used for detecting the above type (a) error wherein a ternary + is followed by a ternary −. Referring to FIG. 22, for example, the appearance of the first ternary + will cause the output B1 of the threshold detector TH1 to take the value 1 so that the output Q1 of flip flop FF1 will also take the value 1 at the next clock pulse. If the following ternary signal is −, the output B2 of the threshold detector TH2 will be equal to 1. Thus, the AND gate G84 of circuit 40a will conduct thus producing an error signal E1 as also illustrated in FIG. 44. It will be seen that the appearance of a second ternary signal + or 0 following the first ternary signal + will not render gate G84 conductive.

FIG. 40b illustrates a simple circuit for detecting an error of type (b) above, that is a ternary − followed by a ternary +. Indeeed, the appearance of a ternary − will cause the output B2 of threshold detector TH2 of FIG. 22 to be equal to 1 and, at the next clock pulse, the output Q2 of the flip flop FF21 will take the value 1. The appearance of a following ternary signal + (B1 = 1) will cause the AND gate G85 to produce an error output E2 as also shown in FIG. 44.

FIG. 40c illustrates a simple circuit for detecting an error of type (c) above, that is two consecutive ternary 0. Obviously, the appearance of the first ternary 0 will render the outputs B1 and B2 of threshold detectors TH1 and TH2 in FIG. 22 equal to 0 and, at the nect clock pulse, the outputs $\overline{Q1}$ and $\overline{Q2}$ of flip flops FF20 and FF21 will take the value 1. If the following ternary signal is also a 0, $\overline{B1}$ and $\overline{B2}$ will take the value 1, and AND gate G86 will produce an error signal E3 which is also illustrated in FIG. 44.

From the Morgan equation $\overline{a+b} = \overline{a}\,\overline{b}$, the circuit of FIGS. 40a to 40c may be realized in practice by using NOR gates G87 to G89 instead of AND gates G84 to G86 respectively as illustrated in FIGS. 41a to 41c.

FIG. 42a illustrates another circuit for detecting an error of type (a). Referring again to FIG. 22, the appearance of a first ternary signal + will cause the output B1 of the threshold detector TH1 to take the value 1 and at the next clock pulse the output $\overline{Q1}$ of the flip flop FF20 will take the value 0. If the following ternary signal is −, the output $\overline{B2}$ of the threshold detector TH2 will take the value 0 thus producing a signal $\overline{E1}$ equal to 0 at the output of OR gate G90; such will indicate the error.

FIG. 42b illustrates another circuit for detecting an error of type (b). Indeed, the appearance of a ternary − will cause the output B2 of threshold detector TH2 of FIG. 22 to be equal to 1 and, consequently, the output $\overline{Q2}$ of flip flop FF21 to take the value 0 at the next clock pulse. The appearance of a following ternary + will cause the output $\overline{B1}$ to take the value 0 and OR gate G91 will provide an output $\overline{E2}$ of value 0 indicating the error.

FIG. 42c illustrates a circuit for detecting an error of type (c). Obviously, the appearance of the first ternary 0 will render the outputs B1 and B2 of threshold detectors TH1 and TH2 in FIG. 22 equal to 0 and, at the next clock pulse, the outputs Q1 and Q2 of flip flops FF20 and FF21 will take the value 0. If the following ternary signal is also a 0, B1 and B2 will take the value 0 and, consequently, OR gate G92 will produce an error signal $\overline{E3}$ equal 0.

In accordance with the Morgan equation $\overline{a\,b} = \overline{a} + \overline{b}$, the circuits of FIGS. 42a to 42c may be realized in practice by using NAND gates G93 to G95 instead of OR gates G90 to G92 as illustrated in FIGS. 43a to 43c.

Since the transition matrix of the Markov chain asociated with the BCT1 and BCT2 codes is the same, these two codes have the same correlation function and, consequently, the same power density spectrum. Such spectrum is illustrated in FIG. 45 which also illustrates, for the purpose of comparison, the power density spectra of the binary and duobinary codes, the power density spectrum of the binary having been calculated for the case in which the binary digits 0 and 1 have the same probability factor and are independent. The power density spectrum of the duobinary and of the BCT have been calculated from a binary signal of the above-mentioned type and the digits assumed to be of rectangular form.

FIG. 46 illustrates the power ratio which is located within the power density spectrum depending on the bandwidth used. It is assumed that an ideal low-pass filter is used and that the frequency is normalized with respect to the duration T of the digits.

The two groups of curves illustrated in FIGS. 45 and 46 illustrate that the BCT is equivalent to the duobinary having regard to the width of its spectrum. It is better than the duobinary concerning the detection of the errors due to transmission. Another advantage of the BCT is that its states +, 0 and − have equal probabilities which permit to lower the error probabilities. The above disclosed BCT1 and BCT2 codes are identical as far as the correlation functions and code violations are concerned but each has a particularity of its own. Indeed, in the BCT2, a series of 0 (or 1) will be converted after one or two digits into a sequence of ternary − (or +). In the BCT1, on the contrary, a series of 0 (or 1) will be converted two times out of three in an alternated sequence of ternary 0 and − (or of 0 and +). This constitutes a great advantage as far as synchronization is concerned because the synchronization signal may be extracted from the BCT message.

Although the invention has been disclosed with reference to different embodiments thereof, it is to be understood that various modifications may be made thereto and that the invention is to be limited by the claims only.

We claim:

1. A modulator for converting a binary code into a ternary code comprising:

a. an inverter for receiving a binary code B and capable of generating at its output the complement $\overline{B}$;

b. a first and a second flip flop of the JK type each having two inputs J and K and two complementary outputs Q and $\overline{Q}$ satisfying the following logic equations:

$$Q_{n+1} = \overline{Q_n}\,J_n + Q_n\,\overline{K_n} \qquad (1)$$

$$\overline{Q_{n+1}} = \overline{Q_n}\,\overline{J_n} + Q_n\,K_n \qquad (2)$$

c. a first and a second gate each having two inputs and one output, the output of said first and second gates connected to one of the inputs J and K of the first and second flip flops respectively;

d. an arithmetic adder having a first and a second input and one output, the first and second inputs of said arithmetic adder connected to one output of said first and second flip flops respectively and the output of said arithmetic adder providing said ternary code; and e. means interconnecting the outputs of said first and second gates to one of the inputs J and K of said first and second flip flops respectively, one of the outputs Q and Q of said first and second flip flops to the first and second inputs respectively of said arithmetic adder, one of the binary code B and its complement $\overline{B}$ to one input of said first and second flip flops and to the first input of said first and second gates, and the second input of the first and second gates to one output of said second and first flip flops respectively so that the first and second inputs of said arithmetic adder satisfy the following logic equations respectively:

$$Y_{1n+1} = \overline{Y_{1n}}\ \overline{Y_{2n}}\ B_n + Y_{1n}\ B_n \qquad (3)$$

$$Y_{2n+1} = \overline{Y_{1n}}\ \overline{Y_{2n}}\ B_n + Y_{2n}\ B_n \qquad (4)$$

wherein $B_n$ = a digit of the binary code, $Y_{1n}$, $Y_{2n}$ = the present state of the ternary code expressed in binary form, $Y_{1n+1}$, $Y_{2n}$ = the following state of the ternary code expressed in binary form.

2. A modulator as defined in claim 1, wherein equations (3) and (4) are correlated with equation (1) and wherein said first and second gates are AND gates, and wherein the outputs of the first and second gates are connected respectively to the input J of the first and second flip flops, the output Q of said first and second flip flops is connected to the arithmetic adder, the binary code B and its complement $\overline{B}$ are connected to the inputs K of said second and first flip flops respectively and to the first input of the second and first AND gates respectively, and the second input of said first and second AND gates are connected to the output $\overline{Q}$ of the second and first flip flops respectively.

3. A modulator as defined in claim 1, wherein equations (3) and (4) are correlated with equations (1) and (2) respectively and wherein said first and second gates are AND gates, whereby the outputs of the first and second AND gates are connected respectively to the input J of the first flip flop and to the input K of the second flip flop, the output Q of the first flip flop is connected to the first input of the arithmetic adder whereas the output $\overline{Q}$ of the second flip flop is connected to the second input of the arithmetic adder, the binary code B and its complement $\overline{B}$ are connected to the input J of the second flip flop and to the input K of the first flip flop respectively and to the first input of the second and first AND gates respectively, and the second input of the first and second AND gates is connected to the output Q of the second flip flop and to the output $\overline{Q}$ of the first flip flop respectively.

4. A modulator as defined in claim 1, wherein equations (3) and (4) are correlated with equations (2) and (1) respectively and wherein said first and second gates are AND gates, whereby the outputs of said first and second AND gates are connected to the input K of the first flip flop and to the input J of the second flip flop respectively, the output $\overline{Q}$ of the first flip flop and the output Q of the second flip flop are connected to the first and second inputs respectively of the arithmetic adder, the binary code B and its complement $\overline{B}$ are connected to the input K of the second flip flop and to the input J of the first flip flop respectively and to the first input of the second and first AND gates respectively, the second input of the first and second AND gates being connected to the output $\overline{Q}$ of the second flip flop and to the output Q of the first flip flop respectively.

5. A modulator as defined in claim 1, wherein equations (3) and (4) are correlated with equation (2) and wherein said first and second gates are AND gates, whereby the outputs of said first and second AND gates are connected to the inputs K of said first and second flip flops respectively, the outputs $\overline{Q}$ of the first and second flip flops are connected to the first and second inputs of the arithmetic adder respectively, the binary signal B and its complement $\overline{B}$ are connected to the inputs of the second and first flip flops respectively and to the first input of the second and first AND gates respectively, the second input of the first and second AND gates being connected to the outputs Q of the second and first flip flops respectively.

6. A modulator as defined in claim 1, wherein equations (3) and (4) are correlated with equation (1) and wherein said first and second gates are NOR gates, whereby the outputs of the first and second NOR gates are connected to the inputs J of the first and second flip flops respectively, the outputs Q of the first and second flip flops are connected to the first and second inputs respectively of the arithmetic adder, the binary code B and its complement $\overline{B}$ are connected to the inputs K of the second and first flip flops respectively and to the first input of the first and second NOR gates respectively, the second input of the first and second NOR gates being connected to the output Q of the second and first flip flops respectively.

* * * * *